(12) United States Patent
Ivanic et al.

(10) Patent No.: US 9,390,404 B2
(45) Date of Patent: Jul. 12, 2016

(54) METHODS, APPARATUSES, AND SYSTEMS FOR GENERATING SOLUTIONS

(71) Applicant: GroupSolver, Inc., San Diego, CA (US)

(72) Inventors: Rastislav Ivanic, San Diego, CA (US); Maros Ivanic, Silver Spring, MD (US)

(73) Assignee: GROUPSOLVER, INC., San Diego, CA (US)

( * ) Notice: Subject to any disclaimer, the term of this patent is extended or adjusted under 35 U.S.C. 154(b) by 0 days.

(21) Appl. No.: 14/537,550

(22) Filed: Nov. 10, 2014

(65) Prior Publication Data
US 2015/0134543 A1     May 14, 2015

Related U.S. Application Data

(60) Provisional application No. 61/901,440, filed on Nov. 8, 2013.

(51) Int. Cl.
| | |
|---|---|
| *G06F 15/18* | (2006.01) |
| *G06Q 10/10* | (2012.01) |
| *G06N 7/00* | (2006.01) |
| *G06N 99/00* | (2010.01) |
| *G06N 5/02* | (2006.01) |

(52) U.S. Cl.
CPC .............. *G06Q 10/101* (2013.01); *G06N 5/025* (2013.01); *G06N 7/005* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 6,865,517 B2 | 3/2005 | Bantz et al. | |
| 6,985,889 B1 * | 1/2006 | Tapio | G06N 5/025 706/45 |
| 7,093,233 B1 * | 8/2006 | Subramanya | G06F 17/30943 717/123 |
| 7,110,510 B1 * | 9/2006 | Shaffer | H04M 3/533 379/88.25 |
| 7,155,157 B2 | 12/2006 | Kaplan | |
| 7,526,442 B2 * | 4/2009 | Edgar | G06Q 40/00 705/35 |
| 7,890,549 B2 | 2/2011 | Elad et al. | |
| 8,069,131 B1 | 11/2011 | Luechtefeld et al. | |

(Continued)

OTHER PUBLICATIONS

Tanbeer et al.—Efficient single-pass frequent pattern mining using a prefix-tree—Feb. 15, 2009—http://www.sciencedirect.com/science/article/pii/S0020025508004532#.*

(Continued)

*Primary Examiner* — Viker Lamardo
(74) *Attorney, Agent, or Firm* — Loza & Loza LLP; Razmig Messerian

(57) ABSTRACT

One feature pertains to a computer-readable storage medium having instructions for generating group solutions stored thereon, the instructions when executed by at least one processor causes the processor to receive a plurality of solution statements from a plurality of users, determine that two or more solution statements of the plurality of solution statements are positively and significantly correlated with each other, and generate a group solution that includes the two or more solution statements determined to be positively and significantly correlated with each other. The two or more solution statements having the positive and significant correlation tending to be included concurrently in the plurality of solution statements received from the plurality of users.

25 Claims, 16 Drawing Sheets

(56) References Cited

U.S. PATENT DOCUMENTS

| | | | | |
|---|---|---|---|---|
| 8,412,661 | B2* | 4/2013 | Brillhart | G06Q 30/0203 705/7.11 |
| 8,442,839 | B2 | 5/2013 | Yen et al. | |
| 8,504,621 | B2 | 8/2013 | Ruff et al. | |
| 8,639,650 | B1 | 1/2014 | Gill | |
| 8,731,455 | B2 | 5/2014 | Colby et al. | |
| 8,943,002 | B2* | 1/2015 | Zelenko | G06F 17/30867 706/12 |
| 2006/0281510 | A1* | 12/2006 | Moreno | A63F 9/18 463/9 |
| 2009/0006472 | A1* | 1/2009 | Bush | G06F 17/2247 |
| 2009/0198613 | A1 | 8/2009 | Reeves et al. | |
| 2009/0248665 | A1* | 10/2009 | Garg | G06F 17/30654 |
| 2010/0191691 | A1 | 7/2010 | Hudson, Jr. | |
| 2010/0235854 | A1* | 9/2010 | Badgett | G09B 7/06 725/24 |
| 2010/0306157 | A1 | 12/2010 | Onuchin et al. | |
| 2011/0060765 | A1* | 3/2011 | Sieb | G06N 5/025 707/797 |
| 2011/0071978 | A1* | 3/2011 | Lottridge | G06Q 10/10 706/54 |
| 2011/0307478 | A1* | 12/2011 | Pinckney | G06N 99/005 707/724 |
| 2012/0052474 | A1 | 3/2012 | Voehl et al. | |
| 2012/0110087 | A1* | 5/2012 | Culver | G06F 17/5004 709/205 |
| 2012/0303358 | A1* | 11/2012 | Ducatel | G06F 17/2211 704/9 |
| 2013/0017523 | A1* | 1/2013 | Barborak | G09B 7/04 434/322 |
| 2013/0088484 | A1* | 4/2013 | Marra | G06Q 50/01 345/418 |
| 2013/0110660 | A1* | 5/2013 | Yang | G06Q 30/02 705/26.1 |
| 2013/0260352 | A1* | 10/2013 | Abraham | G09B 7/02 434/350 |
| 2013/0262466 | A1* | 10/2013 | Mayumi | G06F 17/30598 707/737 |
| 2014/0019394 | A1* | 1/2014 | Laxminarayan et al. | 706/45 |
| 2014/0074443 | A1 | 3/2014 | Cheng et al. | |
| 2014/0101079 | A1* | 4/2014 | Deal | G06N 5/045 706/12 |
| 2014/0298199 | A1* | 10/2014 | Johnson, Jr. | G06Q 10/101 715/753 |

OTHER PUBLICATIONS

Tang, Wei et al.; "Semi-Supervised Consensus Labeling for Crowdsourcing"; https://www.ischool.utexas.edu/~ml/papers/tang-cir11.pdf; Aug. 2011; 13 pages.

Kamar, Ece et al.; Combining Human and Machine Intelligence in Large-scale Crowdsourcing; Proceedings of the 11th Intl. COnference on Autonomous Agents and Multiagent Systems (AAMAS 2012); Conitzer, Winikoff, Padgham, and van der Hoek (eds.); Jun. 4-8, 2012; http://research.microsoft.com/en-us/um/people/horvitz/CrowdSynth.pdf; 8 pages.

* cited by examiner

Projects ✚ 212 | Search in Project 216

Pre testNew projects
👤 11
North Korea Public Policy
North Korea possesses
nuclear wea...

👤 13
Marriage Equality
Should marriage be defined
as betw...

👤 10
GroupSolver Pre-Test
This is the first test of the
GroupSol...

New projects
👤 41
MKTG420: College athletics
as a consumer product
American public has strong
emotion...

New projects

New projects
👤 8
Test project: Gun Re...
The US Constitutio...

Groups ✚ 214

Pre-Test Group
Friends helping us break GroupSolv...

My students
These are my students

METHODS, APPARATUSES, AND SYSTEMS FOR GENERATING SOLUTIONS

CLAIM OF PRIORITY

The present application for patent claims priority to provisional application No. 61/901,440 entitled "Transformation of Independently Generated User Contributions into Consensus Solutions" filed Nov. 8, 2013, the entire disclosure of which is hereby expressly incorporated by reference.

BACKGROUND

1. Field

Various features generally relate to data processing, and more particularly to methods, apparatuses, and systems that automatically generate and provide one or more group solutions to problems and/or projects handled by a group of individuals.

2. Background

Advances in social networking and mobile computing make it possible for many people to communicate and collaborate with each other in real time. In the recent past, much attention has been paid to engaging people with different levels of understanding, time availability, positions, and objectives in solving important day-to-day problems (e.g., managerial). These efforts have been most successfully applied to solving simple, binary, and/or easily quantifiable problems. More complex, qualitative problems, such as collaborative problems (i.e., problems that are tackled by groups of people) have benefited in a very limited degree from these advances.

Most systems that focus on collaborative problem solving typically rely on one of two methods. The first method strives to identify experts within the collaborative group who are most likely to answer the question correctly, and then it enables those experts to solve the problem. This method is not optimal because it leaves out potentially valuable inputs to the solution that may have been provided by others in the group who were not deemed to be experts. Alternatively, the second method queries the collaborative group to select or prioritize individual ideas proposed to solve the problem, for example, through voting and selecting individual ideas with the greatest number of votes. In both cases, the focus is on imposing constraints on user inputs (e.g., expert validation, voting) in order to obtain convergence on a single solution rather than finding a consensus solution that embodies and includes solution ideas from many different individuals of the collaborative group who have been allowed to express themselves essentially freely.

Thus, a platform that allows for incorporation of plurality of inputs from a plurality of users and produces one, two, three, four or more solutions reflecting a consensus from the various inputs is an improvement over existing platforms. The ability to produce such consensus solutions across an essentially unlimited number of users and inputs would be a powerful tool in many industries including but not limited to, market research or complex business decision making, where it is desirable to know the overall sentiment of any group and its members or users to a given problem or set of problems. For example, each individual of a group may possess a particular expertise in one aspect but does may have the expertise in all aspects of a problem. As such, providing a group solution that incorporates inputs from many individuals, users or experts of the group provides a collaborative solution for most problems. It is also desirable to provide a comprehensive and consensus solution proposed by members and users of the group rather than ranking and selecting individual ideas or inputs as the solution that may not produce a final set of selected ideas which would be consistent with each other.

Thus, there is a need for improved methods and systems that are capable of generating comprehensive solutions to group problems by analyzing and incorporating inputs submitted by individuals of any group.

SUMMARY

One feature provides a computer-readable storage medium having instructions for generating group solutions stored thereon, the instructions when executed by at least one processor causes the processor to receive a plurality of solution statements from a plurality of users, determine that two or more solution statements of the plurality of solution statements are positively and significantly correlated with each other, and generate a group solution that includes the two or more solution statements determined to be positively and significantly correlated with each other. According to one embodiment, the two or more solution statements that are positively and significantly correlated tend to be included concurrently in the plurality of solution statements received from the plurality of users. According to another embodiment, the instructions when executed by the processor further cause the processor to (a) identify a most common solution statement from the plurality of solution statements received from the plurality of users, (b) insert the most common solution statement identified in (a) into a primary group solution, (c) identify a next most common solution statement from the plurality of solution statements that has not yet been inserted into the primary group solution and is positively correlated with all other solution statements of the primary group solution, (d) insert the next most common solution statement identified in (c) into the primary group solution, and (e) repeat (c) and (d) until no next most common solution statement is identified, thereby generating the primary group solution.

According to one embodiment, the instructions when executed by the processor further cause the processor to (a) identify those solution statements of the plurality of solution statements that are negatively and significantly correlated to the most common solution statement, (b) identify and insert a most common negatively correlated solution statement from the solution statements identified in (a) into an alternative group solution, (c) identify a next most common negatively correlated solution statement from the solution statements identified in (a) and that has not yet been inserted into the alternative group solution and is positively correlated with all other solution statements of the alternative group solution, (d) insert the next most common negatively correlated solution statement identified in (c) into the alternative group solution, and (e) repeat (c) and (d) until no next most common negatively correlated solution statement is identified, thereby generating the alternative group solution. According to another embodiment, receiving the plurality of solution statements from the plurality of users includes receive from each of the plurality of users at least one solution statement of the plurality of solution statements, and receive from at least one or more of the plurality of users a set of solution statements that includes two or more solution statements from the plurality of solution statements. According to yet another embodiment, determining that two or more solution statements of the plurality of solution statements are positively and significantly correlated includes determining that the two or more solution statements have a correlation value that is greater than or equal to a preselected positive correlation threshold value.

According to one embodiment, determining that two or more solution statements of the plurality of solution statements are positively and significantly correlated includes determining that a correlation value associated with the two or more solution statements has a confidence interval that is greater than or equal to a preselected confidence interval threshold value. According to another embodiment, the plurality of solution statements and the group solution are directed at providing solutions to a project that the plurality of users are attempting to solve. According to yet another embodiment, the instructions when executed by the processor further cause the processor to receive a first solution statement of the plurality of solution statements from a first user of the plurality of users analyze semantics of the first solution statement and determine that the first solution statement is similar in meaning to a second solution statement of the plurality of solution statements, the second solution statement having been received by a greater number of users than the first solution statement and prompt the first user to replace the first solution statement with the second solution statement.

According to one embodiment, the instructions when executed by the processor further cause the processor to transmit one or more queries to the plurality of users, receive one or more responses to the one or more queries from the plurality of users, and assign at least two or more of the plurality of users to a plurality of sub-groups based on the one or more responses received. According to another embodiment, the instructions when executed by the processor further cause the processor to generate at least a first sub-group solution based on the solution statements received from a first sub-group of users of the plurality of users assigned to a first sub-group, and generate at least a second sub-group solution based on the solution statements received from a second sub-group of users assigned to a second sub-group. According to yet another embodiment, the instructions when executed by the processor further cause the processor to receive one or more changes to one or more solution statements received from at least one user of the plurality of users, and regenerate the group solution based on the one or more changes received.

According to one embodiment, regenerating the group solution based on the one or more changes received includes determine that at least one of the changed solution statements and at least one other solution statement of the plurality of solution statements are positively and significantly correlated with each other, and regenerate the group solution to include the at least one changed solution statement and the at least one other solution statement of the plurality of solution statements determined to be positively and significantly correlated with each other. According to another embodiment, the instructions when executed by the processor further cause the processor to provide the group solution to at least a portion of the plurality of users. According to yet another embodiment, the instructions when executed by the processor further cause the processor to grant a license to select users of the plurality of users, the license allowing the select users to at least one of view other user solution statements, view the group solution, and/or receive updates to the group solution.

Another feature provides a server comprising a communication interface configured to communicate with a plurality of client devices, a processing circuit communicatively coupled to the communication interface, the processing circuit configured to receive a plurality of solution statements from the plurality of client devices, wherein the plurality of solution statements received includes at least one solution statement from each of the client devices and one or more sets of solution statements from one or more of the client devices, the sets of solution statements each including two or more solution statements, determine that at least two solution statements of the plurality of solution statements are positively and significantly correlated with each other in that the at least two solution statements are included in at least one set of solution statements received, and generate a group solution that includes the at least two solution statements determined to be positively and significantly correlated with each other. According to one embodiment, the processing circuit is further configured to provide the plurality of users with a project solution interface, the project solution interface configured to be displayed on a display of a client device associated with each of the plurality of users, the project solution interface enabling each of the plurality of users to perform at least one of at least one of view, submit, and/or modify one or more of their own solution statements provided to and received at the server, view one or more solution statements associated with other users of the plurality of users, and/or view the group solution. According to another embodiment, the project solution interface further enables each of the plurality of users to select at least one of a solution statement associated with another user of the plurality of users as their own solution statement, and transmit the selected solution statement to the server.

According to one embodiment, the processing circuit is further configured to determine popularity percentage values for one or more of the solution statements of the plurality of solution statements, the popularity percentage values indicating the percentage of the plurality of users that submitted the one or more solution statements to the server, and wherein the popularity percentage values are displayed within the project solution interface for at least one of (a) the one or more of their own solution statements provided to and received at the server, (b) the one or more solution statements associated with other users of the plurality of users, and/or (c) the group solution. According to another embodiment, the processing circuit is further configured to provide the plurality of users with a dashboard interface, the dashboard interface configured to be displayed on a display of a client device associated with each of the plurality of users, the dashboard interface enabling each of the plurality of users to perform at least one of view and select one or more projects accessible to the user, view and select one or more groups the user is part of, and/or search for terms within one or more projects accessible to the user. According to yet another embodiment, the processing circuit is further configured to perform at least one of the following processes determine the average use of each solution statement among the plurality of users, determine the correlation among solution statement use across the plurality of users based on user characteristics received from the plurality of users, rate the semantic similarity of solution statements in relation to other solution statements, group solution statements of the plurality of solution statements together based on their rated semantic similarity, tag portions of a solution statement of the plurality of solution statements by identifying key words characterizing the solution statement, and/or link one or more solution statements submitted by a user of the plurality of users to at least one of their user name and/or user profile. According to yet another embodiment, the processing circuit is further configured to receive a first set of solution statements from a first user of the plurality of users, compare the first set of solution statements received to sets of solution statements received from other users of the plurality of users, determine that the first set of solution statements does not include at least one solution statement included in the sets of solution statements received from the other users, and prompt the first user to add the at least one solution statement included in the sets of solution statements received from the other users.

Another feature provides a method of generating group solutions to a project, the method comprising (a) receiving a plurality of solution statements from a plurality of users, (b) identifying a most common solution statement from the plurality of solution statements, (c) inserting the most common solution statement identified in (b) into a primary group solution, (d) identifying a next most common solution statement from the plurality of solution statements that has not yet been inserted into the primary group solution and is positively and significantly correlated with all other solution statements of the primary group solution, (e) inserting the next most common solution statement identified in (d) into the primary group solution, and (f) repeating (d) and (e) until no next most common solution statement is identified, thereby generating the primary group solution. According to one embodiment, the method further comprises (g) identifying those solution statements of the plurality of solution statements that are negatively and significantly correlated to the most common solution statement, (h) identifying and inserting a most common negatively correlated solution statement from the solution statements identified in (g) into an alternative group solution, (i) identifying a next most common negatively correlated solution statement from the solution statements identified in (g) and that has not yet been inserted into the alternative group solution and is positively and significantly correlated with all other solution statements of the alternative group solution, (j) inserting the next most common negatively correlated solution statement identified in (i) into the alternative group solution, and (k) repeating (i) and (j) until no next most common negatively correlated solution statement is identified, thereby generating the alternative group solution. According to another embodiment, the solution statements of the primary group solution are ranked and arranged in at least one of a numerical order and/or a hierarchical order consistent with the numerical order and/or hierarchical order most commonly found in the received plurality of solution statements.

BRIEF DESCRIPTION OF THE DRAWINGS

FIG. 10 illustrates a first exemplary method for generating group solutions to a project for which a plurality of users are tasked to submit solution statements and find a solution to.

FIG. 11 illustrates a second exemplary method for generating group solutions to a project for which a plurality of users are tasked to submit solution statements and find a solution to.

FIG. 12 illustrates a third exemplary method for generating group solutions to a project for which a plurality of users are tasked to submit solution statements and find a solution to.

FIG. 15 illustrates an exemplary dashboard interface.

FIG. 16 illustrates an exemplary project solution interface.

DETAILED DESCRIPTION

Figure 1:
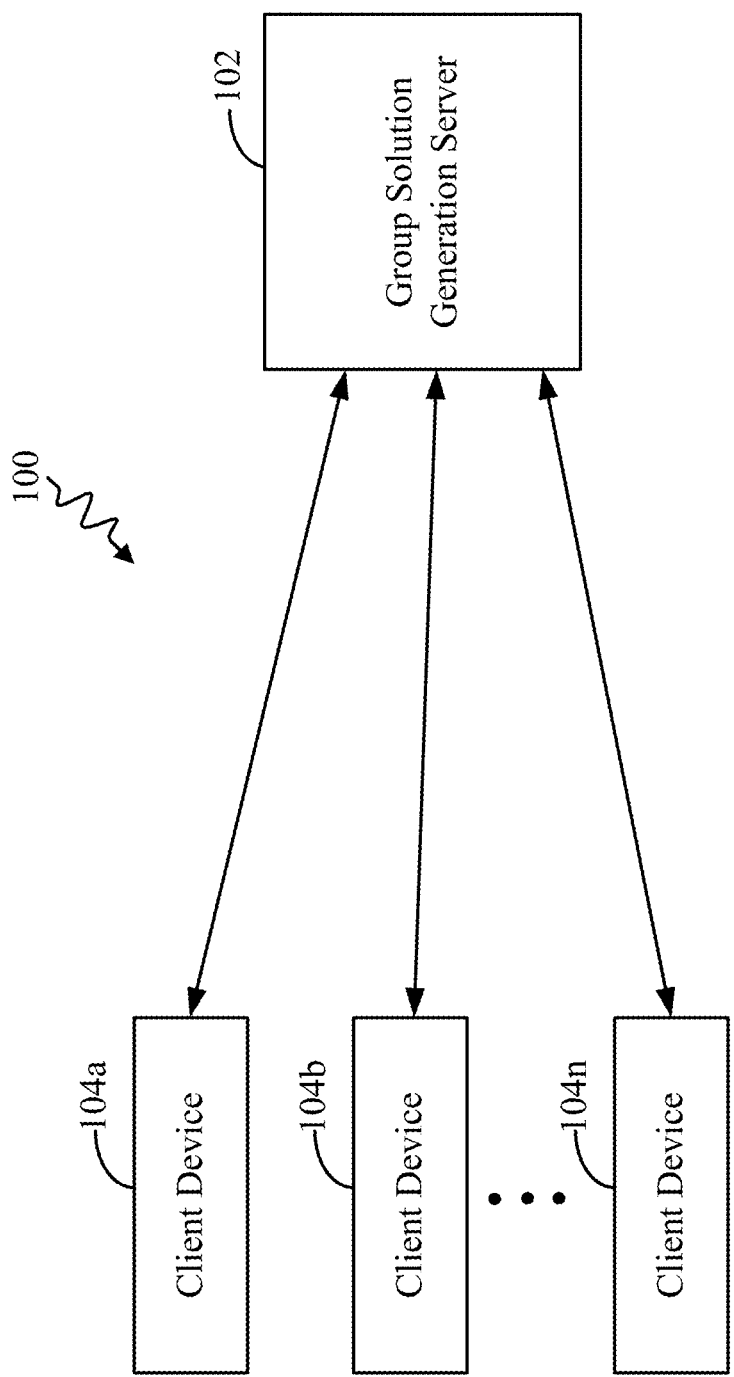
FIG. 1 illustrates a high-level schematic block diagram of a system for generating group solutions for a group of users.

In the following description, specific details are given to provide a thorough understanding of the various aspects of the disclosure. However, it will be understood by one of ordinary skill in the art that the aspects may be practiced without these specific details. For example, circuits and structures may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "embodiment" does not require that all aspects of the disclosure include the discussed feature, advantage, or mode of operation. As described herein, the term "server" shall include a single computer server or a plurality of computer servers. The term "client" shall include client devices such as a wireless mobile device, cell phone, smart phone, media player, a personal computer, a navigation device, a tablet, a television set top box, or any other networked or electronic communication device.

The term "project" as used herein refers to any problem(s), question(s), issue(s), and/or matter(s). The term "solution statement" as used herein refers to a self-contained statement of an idea in the natural language that provides or attempts to provide a solution to a project. The term "primary group solution" (also may be referred to herein as a "consensus solution") as used herein refers to a set of hierarchically structured and ordered solution statements that represent a common view of the largest number of users from a group or a sub-group of users associated with a project. The term "alternative group solution" as used herein provides an alternative, competing solution to the primary solution for a project and is a set of hierarchically structured and ordered solution statements that represent a common view of a minority of users from a group or a sub-group of users associated with a project.

Overview

The systems, methods, and apparatuses described herein may analyze solution inputs provided by multiple users collaborating on answering qualitative, open-ended questions into meaningful answers. These systems, methods, and apparatuses exploit the rationality of individual solutions developed by the users to generate at least one consensus solution of the group that is internally consistent. In so doing, users are not required to evaluate every single idea presented by the group but rather each user is able to present his or her solution to the problem individually. A back-end process using a method described in this invention identifies the most comprehensive solution given the input by the users, and in some embodiments an alternative solution is also identified. The systems, methods, and apparatuses described herein can be applied in a multitude of industries including but not limited to market research, policy development, management consulting, academic research, product development, customer feedback, business development, and any other application where identifying a consensus of a group is desirable.

In one embodiment, the system calculates and displays one or more internally consistent comprehensive group solutions from solution statements submitted by many different individuals. The system specifically overcomes an array of problems associated with reaching consensus among a number of individuals of a group with different ideas. In one embodiment, the system may calculate sets of group solutions based on the provided human output of structured or unstructured sets of ideas. In one embodiment, the system may produce a solution that is as comprehensive as possible given the existing structures and contents of individual solutions. In one embodiment, the system may produce the group solutions with minimal human user effort, thereby practically eliminating the need for human users to evaluate their preferences of the stated ideas.

In one embodiment, a computer system allows individuals of a group to submit structured representations of their solutions to a stated problem and calculates one or more group solutions out of reported preferences provided by the group. The computer system calculates in real time the set of group solutions and prompts individuals of the group to refine their inputs if desired in order to maximize the scope and comprehensiveness of the group solutions.

Exemplary Methods, Apparatuses and Systems for Group Solution Generation

FIG. 1 illustrates a high-level schematic block diagram of a system 100 for generating group solutions for a group of users according to one embodiment of the present disclosure. The system 100 includes a group solution generation server 102 and a plurality of client devices 104a, 104b, ... 104n in communication (e.g., transmitting and receiving data) with the server 102. Each client device 104a, 104b, ... 104n may be operated by an individual user that is part of a collaborative group that includes at least two or more of the plurality of client devices 104a, 104b, ... 104n. The client devices 104a, 104b, ... 104n are used by individuals/members of a group that may together desire to come up with one or more group solutions to a project. As such, each client device 104a, 104b, ... 104n allows its user to submit/send a proposed solution for the project to the server 102. As will be explained in greater detail below, the server 102 automatically generates and provides to the group one or more group solutions based on the individual solutions received from the client devices 104a, 104b, ... 104n.

Figure 2:
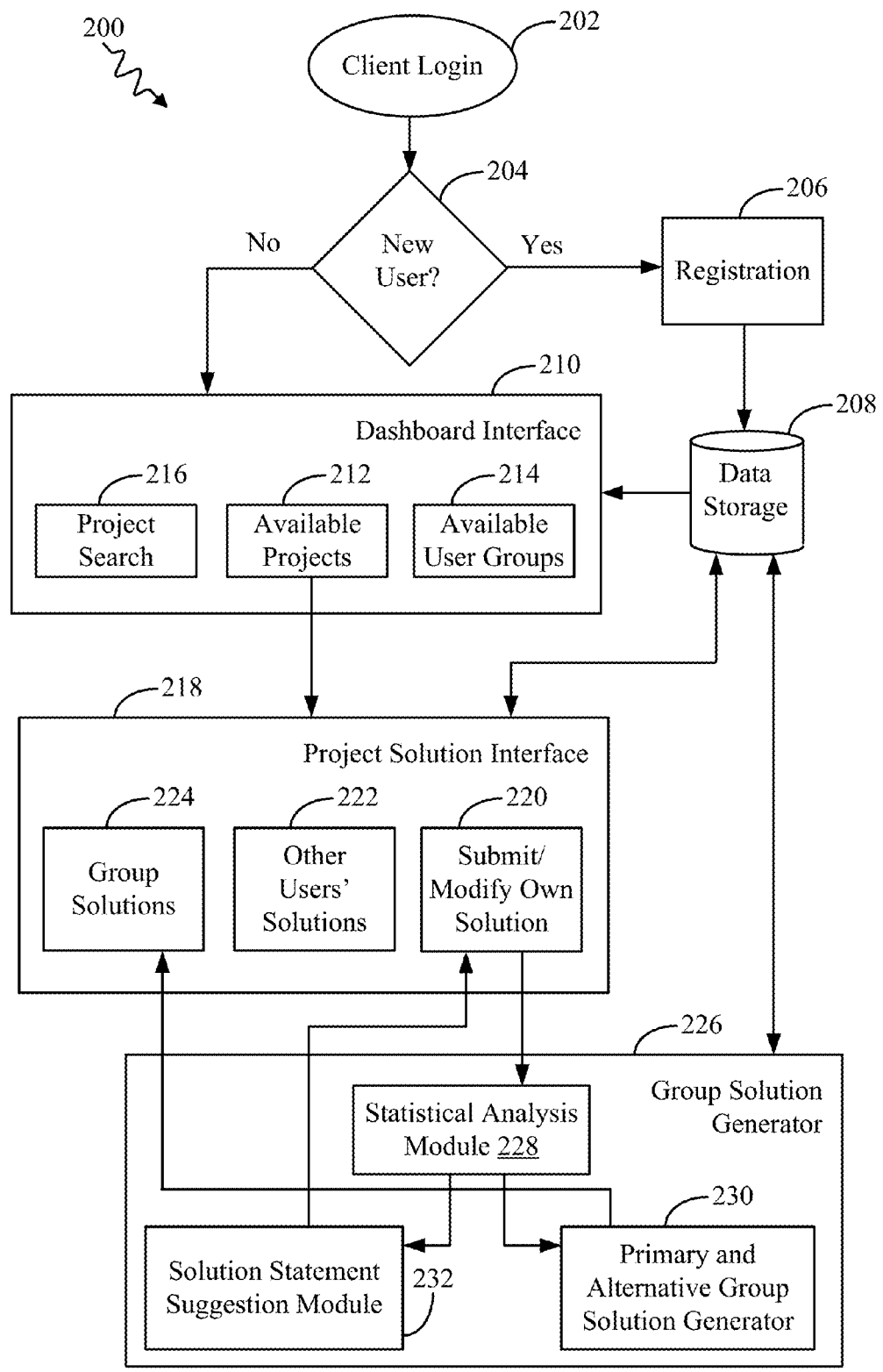
FIG. 2 illustrates a process flow chart of a method operational at the system.

FIG. 2 illustrates a process flow chart of a method 200 operational at the system 100 according to one embodiment. The process begins when an individual/member (e.g., also referred to as a "user") of a project group accesses the server 102 using a client device 104a, 104b, ... 104n by logging in 202. A user may accomplish this by visiting a URL (i.e., website) associated with the server 102 (e.g., it may be hosted or controlled by the server 102). The login 202 may prompt the user for a username and password. Assuming the user is not a new user, he or she may provide a valid username and password for authentication. Alternatively, the user may also use external authentication options by clicking, for example, on a button allowing the user to authenticate through a social media website, including but not limited to Facebook®, Google Plus®, Twitter®, etc.

If the process determines that the user is a new user who has not already registered with the server 102, the user is directed to a registration page/process that collects various types of data about the user including but not limited to name, age, gender, project name the user is attempting to access, and/or various other types of demographic information 206. All or a portion of this data may be stored in a database 208. User rights/licenses that define what projects and/or access the user has may be determined based on the data provided by the user. The user rights/licenses may also be stored at the database 208. According to one embodiment the database 208 is part of the server 102 (See FIG. 1).

After the user has completed registration or it was previously determined that the user had already completed registration (i.e., client is not a new user and is successfully authenticated), the user is directed to a control screen or dashboard 210. According to one non-limiting, non-exclusive example, the dashboard 210 may be a webpage displayed in a browser window of the client device 104a, 104b, ... 104n. According to another non-limiting, non-exclusive example, the dashboard 210 may be part of a software application installed on the client device 104a, 104b, ... 104n. The dashboard 210 allows the user to access projects 212 and user groups 214 that are available to the user based on the user rights that may be stored in the database 208. The dashboard 210 may also allow the user to search 216 through projects and/or user groups. An exemplary dashboard 210 is shown in FIG. 15 having a project search module 216, an available projects module 212, and an available user groups module 214. The user can view and manipulate a group of related projects that are depicted graphically with the information on them.

Assuming the user selects an available project 212 (e.g., one he or she has access to), the user is directed to a project solution interface 218. The solution interface 218 presents the user with an option to submit or modify his or her own solution(s) to the project 220. The interface 218 may also allow the user to view other users' solutions 222 in addition to group solutions (e.g., primary and alternative solutions) 224. According to one non-limiting, non-exclusive example, the interface 218 may be a webpage displayed in a browser window of the client device 104a, 104b, ... 104n. According to another non-limiting, non-exclusive example, the interface 218 may be part of a software application installed on the client device 104a, 104b, ... 104n.

Assuming the user chooses to submit his or her own solution 220, the user enters one or more solution statements (e.g., solution statements in a natural language) and these statements are sent to a group solution generator 226 of the server 102. The solution generator 226 may perform statistical analyses 228 on the solution statements submitted. These statistical analyses 228 may include but are not limited to: determining the average use of each solution statement; and correlation among solution statement use across users and/or user groups as defined by submitted user characteristics (e.g. age, income, other demographic information, etc.). The solution generator 226 may also rate, tally, group, tag, link to user profiles, aggregate, integrate, publish for public comment, and/or retain as confidential the various solution statements provided by the user. Rating may include finding semantic similarity of a submitted statement in relation to other solution statements. Grouping may include putting together statements related in their semantic value. Tagging may include identifying key words characterizing a solution statement. Linking may include associating statements submitted by the user to his or her user name/profile. Aggregating may include suggesting a common solution statement to represent other similar solution statements based on statements' semantic similarity.

The solution statements submitted by the user are also used to generate primary group solutions and also optionally alternative group solutions by the primary and alternative group solution generator 230.

The solution statement suggestion module 232 analyzes the semantic components of a user's submitted solution statement(s) (or to a solution statement(s) not yet submitted but instead still being entered (e.g., typed)) to solution statements submitted by other users. Based on this semantic analysis and possibly other analyses (e.g., probabilistic calculations), the solution statement suggestion module 232 may suggest to the user that the user take certain actions concerning their solution statement(s).

According to one example, the solution statement suggestion module 232 may determine that a solution statement submitted or about to be submitted by a user is very similar in meaning—but worded differently—to another existing solution statement already submitted by other users. In such a case, the module 232 may prompt the user to select the other users' solution statement having the alternative wording in order to consolidate and minimize the number of solution statements that have same or similar meanings but that may have been worded differently. Doing so helps prevent the substantively similar solution statements from competing against each other for insertion into the one or more group solutions.

According to another example, the solution statement suggestion module 232 may determine that a user has submitted essentially the same statement(s) as a large and well defined group of other users but the user may be missing one or more statements that the other users have also submitted. In such a case, the solution statement suggestion module 232 may suggest to the user to include the other users' additional statement(s) that may have been unintentionally omitted. The module 232 may do this if the calculated likelihood that the statement(s) has been omitted by mistake exceeds a predefined threshold.

According to another example, the solution statement suggestion module 232 may help eliminate redundant statements. Using semantic analysis the module 232 may determine that two or more solution statements submitted by a user are redundant and suggest to the user to drop one or more of the determined redundant statements and/or prompt the user to select another existing solution statement with significantly the same meaning as the redundant statements.

Figure 3:
FIG. 3 illustrates an exemplary table of solution statements submitted by a plurality of users collaboratively working on finding one or more solutions to a project.

FIG. 3 illustrates an exemplary table 300 of solution statements submitted by a plurality of users collaboratively working on finding one or more solutions to a project. The table 300 shown is merely an example and may be referred to in some of the methods, apparatuses, and systems described herein to serve as an example for primary and alternative group solution generation. The group of users consists of six users, which are: User A, User B, User C, User D, User E, and User F. Using the process 200 described above with respect to FIG. 2, the users have each submitted one or more solution statements for the project. For example: User A submitted solution statements V, X, and Y; User B submitted solution statements W and Z; User C submitted solution statements V and X; User D submitted solution statements V and X; User E submitted solution statements W and Y; and User F submitted solution statement V.

Figure 4:
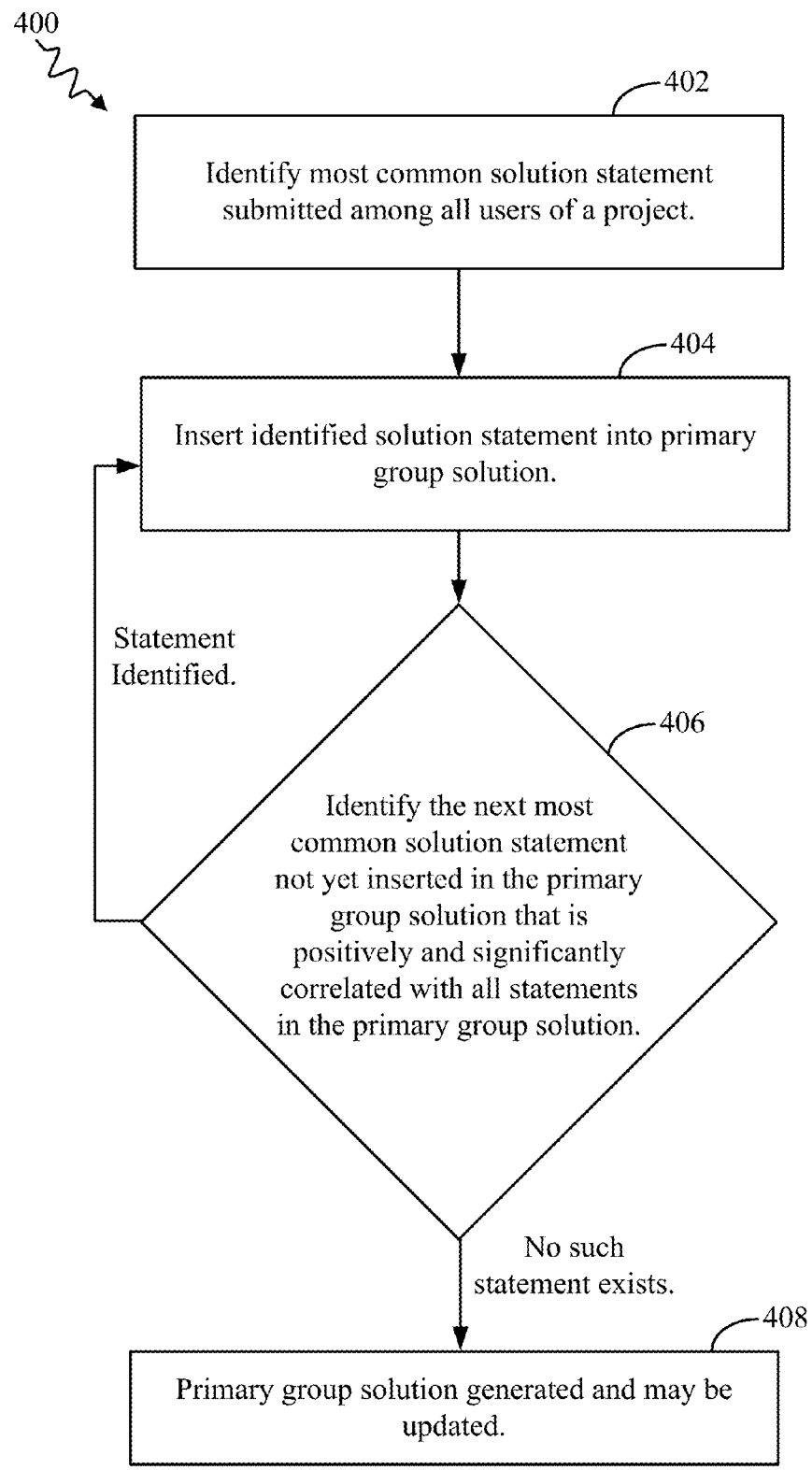
FIG. 4 illustrates a flow chart for a method of generating a primary group solution.

FIG. 4 illustrates a flow chart for a method 400 of generating a primary group solution according to one embodiment of the present disclosure. The primary group solution aims to provide a comprehensive, consensual solution statement representative of the statements submitted by users of a group collaboratively working on a project. In one embodiment, the group solution generator 226 including the primary and alternative group solution generator 230 shown in FIG. 2 may perform the process described below.

First, the most common solution statement submitted among all the users of the group project is identified 402, and then inserted into the primary group solution 404 as the first primary group solution statement. Identification may be made by analyzing the wording of the solution statements by, for example, using semantic software that is capable of comparing words and phrases among a plurality of sentences to find matches. One non-limiting, non-exclusive, example includes the use of Microsoft SQL Servers® semantic search and comparison feature. Applying these steps 402, 404 to the exemplary table 300 provided in FIG. 3, solution statement V may first be identified as the most common solution statement submitted among all the users (e.g., Users A-F), and inserted into the primary group solution as the first primary group solution statement.

Then, the next most common solution statement not yet inserted into the primary group solution that is positively and significantly correlated with all the statements in the primary group solution, if any, is identified 406 and inserted into the primary group solution 404. This process is repeated until no such solution statement can be identified at which point the process results with the generation of the primary group solution 408. As explained in greater detail below, the primary group solution generated 408 may also undergo updating as users make changes to their submitted solution statements.

Generally, two solution statements may be positively correlated with one another if the two statements tend to be included together in the sets of solution statements submitted by users of the group. Similarly, two solution statements may be negatively correlated if the two statements tend not to be included together in the sets of solution statements submitted by users of the group but rather appear separately in different users' set of solutions. A further explanation of how solution statements may be determined to be positively or negatively correlated with one another will be discussed in greater detail herein.

Applying these steps 404, 406, 408 to the exemplary table 300 provided in FIG. 3, the next most common statement not yet inserted into the primary group solution is statement X. Statement X appears to be positively and significantly correlated with statement V because three out of the four users who selected statement V also selected statement X. Assuming this level of positive correlation meets or exceeds a preselected threshold value for positive correlation (discussed in greater detail below) set by a solution manager, statement X is inserted into the primary group solution. Repeating this process, the next most common statement not yet inserted into the primary group solution are statements W and Y, which have each been selected by two users. However, statement W does not appear to be positively and significantly correlated with statements V and X because none of the users who submitted statements V and X also submitted statement W. By contrast, it may be determined that statement Y is or is not positively and significantly correlated with statements V and X because only one user (e.g., User A) out of three who submitted statements V and X also submitted statement Y. Assuming it is determined that statement Y is not positively and significantly correlated with statements V and X, statement Y is not inserted into the primary group solution. At this point the process concludes because none of the remaining statements (i.e., statements W and Z) are positively and significantly correlated with those statements (e.g., statements V and X) inserted into the primary group solution. Thus, the primary group solution may include solution statements V and X where the first statement (e.g., main statement) of the primary group solution is statement V and the second statement is statement X.

In one embodiment, the structure of the primary group solution may be determined by the most commonly observed hierarchical and ordering pattern observed in solution statements submitted by users in support of the solution statements making up the primary group solution. Hence, the solution statement that is most frequently submitted on top of the solution hierarchy in users' (e.g., those users who support the primary group solution) solution statements may also be displayed on top of the hierarchical order of the primary group solution. Also, a solution statement that is most commonly submitted as preceding other statements may also be presented in the primary group solution as preceding those statement. When no pattern of structure is observed in user submitted solution statements, no hierarchy may be applied to the primary group solution and the statements may be presented in the order of their frequency of use.

Figure 5:
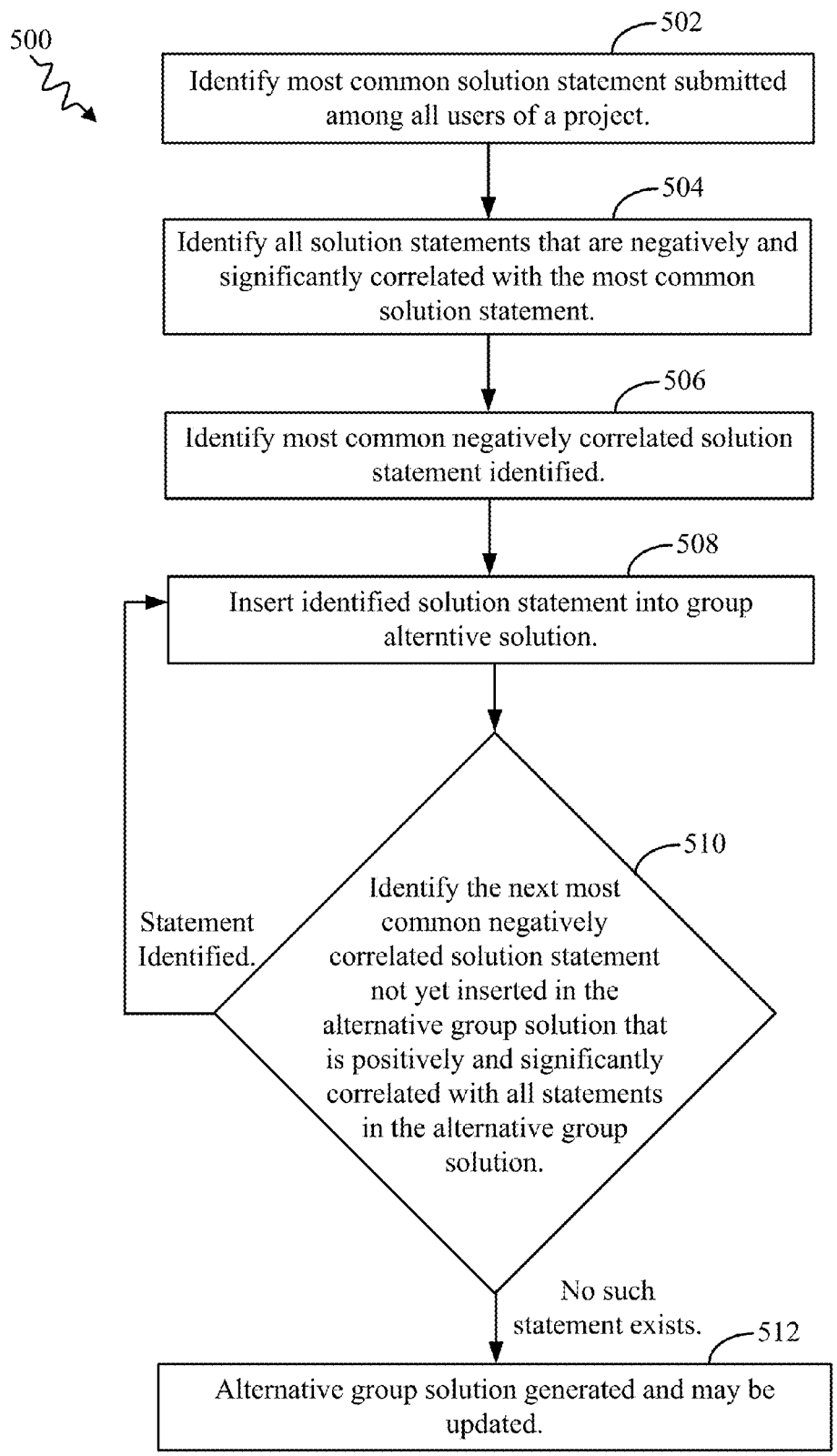
FIG. 5 illustrates a flow chart for a method of generating an alternative group solution.

FIG. 5 illustrates a flow chart for a method 500 of generating an alternative group solution according to one embodiment of the present disclosure. The alternative group solution aims to provide a different, alternative group solution to the primary group solution. In one embodiment, the group solution generator 226 including the primary and alternative group solution generator 230 shown in FIG. 2 may utilize the process described below.

First, the most common solution statement submitted by all the users of the group project is identified 502. Next, all the solution statements that are negatively and significantly correlated with the most common solution statement are identified 504. (The most commonly submitted solution statement out of these solution statements identified in step 504 is herein referred to as the "most common negatively correlated solution statement." Similarly, the next most commonly submitted solution statement out of the solution statements identified in step 504 is herein referred to as the "next most common negatively correlated solution statement.") Then, the most common negatively correlated solution statement is identified 506, and inserted as the first solution statement of the alternative group solution 508.

Applying these steps 502, 504, 506, 508 to the exemplary table 300 provided in FIG. 3, solution statement V may first be identified as the most common solution statement submitted among all the users (e.g., Users A-F). Then, solution statements W and Z are identified as solution statements that are negatively and significantly correlated with solution V since, for example, none of the users who submitted statement V in their set of solutions included solution statements W and Z. Solution statement Y also may or may not be determined to be negatively and significantly correlated with solution statement V. Assuming statement Y is also determined to be negatively and significantly correlated to statement V, solution statement W may be selected as the most common negatively correlated solution statement since two users (e.g., Users B and E) submitted it whereas only one user (e.g., User B) submitted statement Z. Note that two users also submitted solution statement Y but solution statement W may instead be selected as the most common negatively correlated solution statement because it may have been determined that solution statement W has a stronger negative correlation to statement V than statement Y does to statement V since no one user submitted both statements V and W. Statement W may then be inserted as the first (e.g., main) solution statement of the alternative group solution.

Then, the next most common negatively correlated solution statement that has not yet been inserted into the alternative group solution and that is positively and significantly correlated (e.g., satisfies a confidence interval threshold value as described below) with all the other statements in the alternative group solution, if any, is identified 510 and inserted into the alternative group solution 508. This process is repeated until no such next most common negatively correlated solution statement can be identified at which point the process results in the generation of the alternative group solution 512. The alternative group solution generated 512 may also undergo updating as users make changes to their submitted solution statements.

Applying these steps to the exemplary table 300 provided in FIG. 3, the next most common negatively correlated solution statement not yet inserted into the alternative group solution that is positively and significantly correlated with all the other statements in the alternative group solution (i.e., statement W) may be statement Z. Statement Z was submitted by a single user (e.g., User B) who also submitted statement W, which tends to support positive and significant correlation between statements W and Z. However, one user who submitted statement W did not submit statement Z, which tends to not support positive and significant correlation. Assuming statement Z is selected as the next most common statement that is positively and significantly correlated with the statements in the alternative group solution, it is inserted into the alternative group solution. This process continues with identification of the next most common statement that is positively and significantly correlated with the statements of the alternative group solution (at this point now statements W and Z comprise the alternative group solution), which may be statement Y. Assuming statement Y is identified, it is then inserted into the alternative group solution. At this point the process concludes because no remaining solution statement that is negatively and significantly correlated with statement V and is also positively and significantly correlated with the solution statements comprising the alternative group solution can be identified. Thus, the alternative group solution may include solution statements W, Z, and Y, where the first statement (e.g., main statement) of the alternative group solution is statement W, the second statement is statement Z, and the third statement is statement Y.

In one embodiment, the structure of the alternative group solution may be determined by the most commonly observed hierarchical and ordering pattern observed in solution statements submitted by users in support of the solution statements making up the alternative group solution. Hence, the solution statement that is most frequently submitted on top of the solution hierarchy in users' (e.g., those users who support the alternative group solution) solution statements may also be displayed on top of the hierarchical order of the alternative group solution. Also, a solution statement that is most commonly submitted as preceding other statements may also be presented in the alternative group solution as preceding those statement. When no pattern of structure is observed in user submitted solution statements, no hierarchy may be applied to the alternative group solution and the statements may be presented in the order of their frequency of use.

Determining whether two or more solution statements are positively or negatively correlated with one another depends on whether the statements are or are not submitted together by users of the group. The degree to which two or more statements are positively or negatively correlated may also be quantified by a number. For example, a number ranging from −1 to 1 may be used to quantify correlation where −1 corresponds to the highest level of negative correlation and 1 corresponds to highest level of positive correlation. Two or more solution statements may thus be negatively correlated with each other if their correlation value (CV) is less than 0 and greater than or equal to −1 (i.e., $-1 \leq CV < 0$). Similarly, two or more solution statements may be positively correlated with each other if their correlation value is greater than 0 and less than or equal to 1 (i.e., $0 < CV \leq 1$). In the event that two or more solution statements have a correlation value equal to exactly 0 then the solution manager in charge of designing/controlling the project may decide to deem such statements as either negatively or positively correlated.

In addition to the correlation value, a confidence interval value (e.g., "CI" value) designates the significance (e.g., reliability) of the correlation value. The confidence interval value may range from 0 to 1 where values closer to and including 1 (i.e., 100% confidence) indicate a high level of confidence (i.e., high significance) in the determined correlation value and values closer to and including 0 (i.e., 0% confidence) indicate a low level of confidence. A confidence interval value may be interpreted to mean a percentage level of confidence. For example, confidence interval values of 0.35, 0.50, 0.75, and 0.95 correspond to a 35% confidence interval, 50% confidence interval, 75% confidence interval, and 95% confidence interval. The value of the confidence interval is based on the sample size of the solution statements being analyzed for positive or negative correlation. For example, determining that two solution statements have a positive correlation value of 0.55 based on the submitted sets of solutions of 1,000 users of a group will have a higher confidence interval value than determining the same positive correlation value of 0.55 for the two statements based on the submitted sets of solutions of 10 users.

The correlation value and the confidence interval value may be used in concluding whether a statement is deemed negatively correlated or positively correlated to a desired degree of significance with another statement(s) for the processes described in FIGS. 2, 4, and 5. For instance, a confidence interval threshold value having a value between 0 and 1 may be first preselected as the minimum confidence interval value that two or more correlated statements must satisfy before being deemed positively and significantly correlated or negatively and significantly correlated for the processes described in FIGS. 2, 4, and 5. For example, a solution statement may be deemed positively and significantly correlated with another if the two statements have a positive correlation value (e.g., CV>0) and a confidence interval that exceeds a CI threshold value (e.g., at least 95%). Thus, in such a case if two statements have a CV=0.4 and confidence interval of 0.5 (i.e., 50% confidence interval) then they may not be deemed to be positively and significantly correlated with each other and consequently one or more of those statements may not be inserted into the primary and/or alternative group solution. Similarly, a statement may be determined to be negatively and significantly correlated with another statement if the two statements have a negative correlation value (e.g., CV<0) and a confidence interval value that exceeds a CI threshold value (e.g., at least 95%).

The aforementioned CV and CI numbers (e.g., 95% confidence interval) are merely examples and in practice other minimum confidence interval threshold values may be used including but not limited to 50%, 60%, 70%, 80%, 90%, 99%, etc. Generally, the higher the confidence interval threshold value is set the harder it is for two or more statements to be deemed either negatively or positively significantly correlated with one another. Consequently, setting the minimum confidence interval threshold values will have an impact on the number of solution statements inserted into the primary and alternative group solutions. The preselected confidence interval values may be chosen by a person or entity (e.g., solution manager) who created and/or controls the project.

Moreover, preselected minimum correlation value thresholds may also be set before determining that two or more solution statements are positively or negatively correlated, notwithstanding their confidence interval values. For example, two statements may not be deemed to be positively and significantly correlated for the processes described in FIGS. 2, 4, and 5 unless the correlation value exceeds a specific minimum CV threshold value (for example, 0.2). Similarly, two statements may not be deemed to be negatively and significantly correlated for the processes described in FIGS. 2, 4, and 5 unless the correlation value is less than a specific minimum CV threshold value (for example, −0.2). Again, the values provided here are merely exemplary.

Examples of determining whether two or more statements are positively and significantly correlated or negatively and significantly correlated are provided below with reference to FIGS. 3, 4, and/or 5. As one example, it may be necessary during the course of generating a primary group solution (e.g., step 406 following process 400 in FIG. 4) to determine whether statement X is positively and significantly correlated with statement V, the latter statement having been selected and inserted as the first statement in the primary group solution. Based on the example shown in FIG. 3, statement X has been included in the set of solutions submitted by three users (e.g., Users A, C, and D) out of the four users who submitted statement V, but has not been included in the set of solutions of one user (e.g., user F) who submitted statement V. As such, the group solution generator 226 and/or the primary and alterative group solution generator 230 may determine that statements V and X have a correlation value of 0.75 and a confidence interval value of 0.92. Assuming the confidence interval threshold value is 0.90, statement X will be deemed positively and significantly correlated with statement V and may be included in the primary group solution because its confidence interval value of 0.92 exceeds the minimum CI threshold value of 0.90. It may also be assumed for the above example that the correlation value of 0.75 exceeds the minimum positive correlation value threshold, which may be, for example, 0.1. The above values provided are merely exemplary.

As another example, it may be necessary during the course of generating a primary group solution (e.g., step 406 following process 400 in FIG. 4) to determine whether statement Y is positively and significantly correlated with statements V and X, the latter statements having been selected and inserted as the first and second statements, respectively, in the primary group solution. Based on the example shown in FIG. 3, statement Y has been included in the set of solutions submitted by one user (e.g., User A) out of three users who submitted statements V and X, but has not been included in the set of solutions of two users (e.g., Users C and D) who submitted statements V and X. As such, the group solution generator 226 and/or the primary and alterative group solution generator 230 may determine that statement Y with statements V and X have a correlation value of 0.33 and a confidence interval of 0.60. Assuming the confidence interval threshold value is 0.90, statement Y will not be deemed positively and significantly correlated with statements V and X and will not be inserted into the primary group solution because its confidence interval value of 0.60 is less than the threshold value of 0.90. The above provided values are merely exemplary.

As another example, it may be necessary during the course of generating an alternative group solution (e.g., at step 504 following process 500 in FIG. 5) to determine whether statement W is negatively and significantly correlated with statement V, the latter statement having been identified as the most common solution statement submitted among all users (i.e., step 502). Based on the example shown in FIG. 3, statement W has not been included in the set of solutions submitted by any of the four users (e.g., Users A, C, D, and F) who submitted statement V. Moreover, statement V has not been included in the set of solutions submitted by any of the two users (e.g., Users B and E) who submitted statement W. Accordingly, the group solution generator 226 and/or the primary and alterative group solution generator 230 may determine that statements V and W have a correlation value of −0.5 and a confidence interval value of 0.88. Assuming the confidence interval threshold value is 0.85, statement W will be deemed negatively and significantly correlated with statement V and may be selected and inserted as the first statement of the alternative group solution (e.g., steps 506, 508 of FIG. 5) since its confidence interval value of 0.88 exceeds the minimum CI threshold value of 0.85. It may also be assumed for the above example that the correlation value of −0.5 is less than the minimum negative correlation value threshold, which may be, for example, −0.1. The above provided values are merely exemplary.

As another example, it may be necessary during the course of generating an alternative group solution (e.g., at step 510 following process 500 in FIG. 5) to determine whether statement Y is positively and significantly correlated with statements W and Z, the latter statements having been selected and inserted as the first and second statements, respectively, in the alternative group solution. Based on the example shown in FIG. 3, statement Y has not been included in the set of solutions submitted by the one and only user (e.g., User B) who submitted both statements W and Z. Moreover, the two users (e.g., Users A and E) who submitted solution statement Y did not also submit both statements W and Z (although User E submitted statement W). These factors may all be taken into consideration in determining a correlation value and a confidence interval for the correlation of statement Y with statements W and Z. For example, the group solution generator 226 and/or the primary and alterative group solution generator 230 may determine that statement Y with statements W and Z have a correlation value of −0.4 and a confidence interval of 0.7. Assuming the minimum positive correlation threshold value has been preselected and set at 0.65 and the confidence interval threshold value is 0.95, statement Y will be deemed not positively and significantly correlated with statements W and Z and may be excluded from the alternative group solution since −0.4 is less than 0.7 and also because the CI threshold value of 0.95 is not met. These numbers are merely exemplary.

Figure 6:
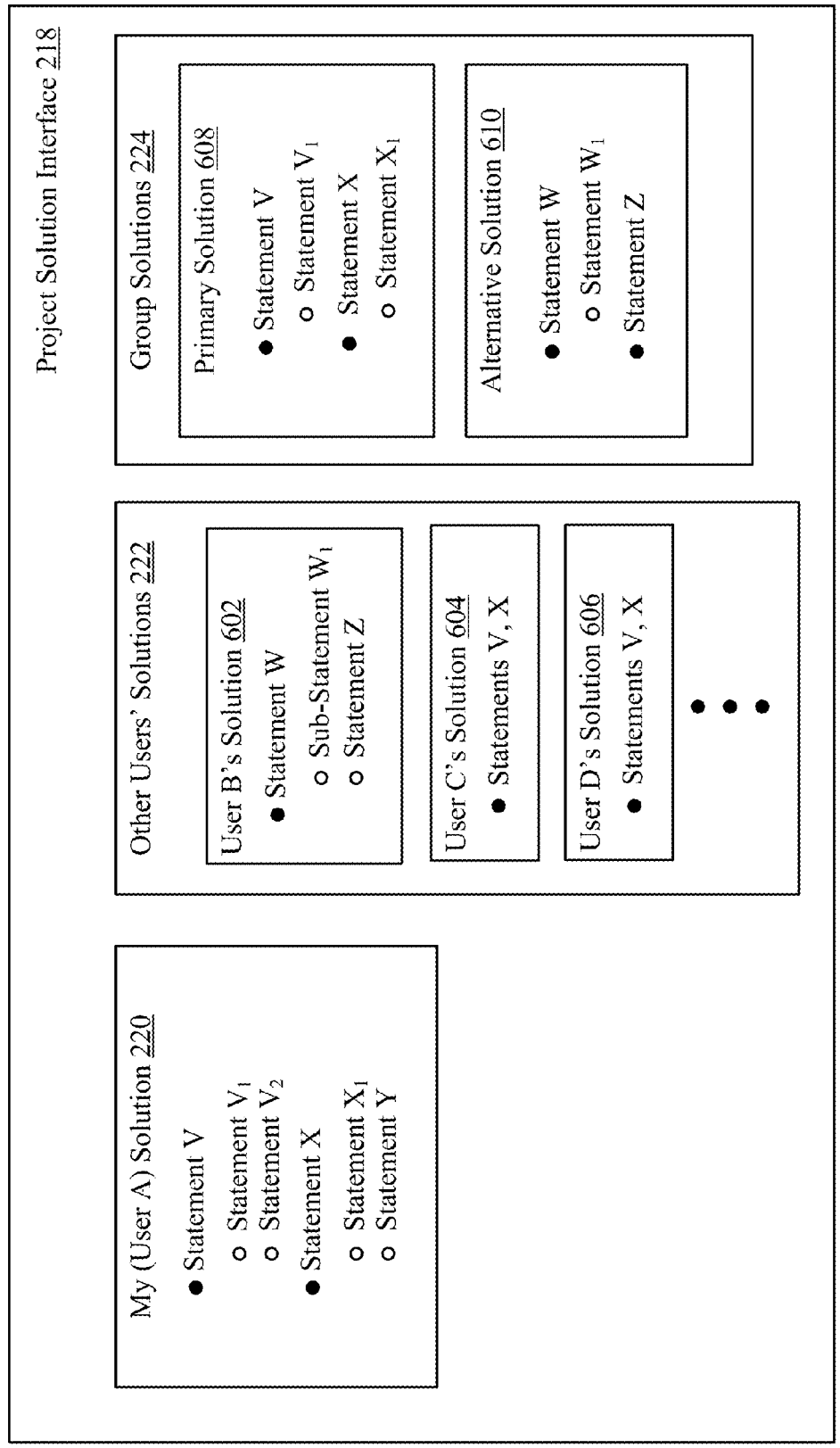
FIG. 6 illustrates a schematic block diagram of the project solution interface.

FIG. 6 illustrates a schematic block diagram of the project solution interface 218 according to one embodiment. The project solution interface 218 may include the active user's own solution statement module 220, the other users' solution statement module 222, and the group solution statements module 224. In one embodiment, these modules 220, 222, 224 may be software modules that are displayed on the user's client device 104*a*-104*n*. In another embodiment, the modules 220, 222, 224 are electronic hardware circuits (e.g., ASICs, etc.) that are specifically designed to perform their specific tasks.

The user's own solution statement module 220 allows a user of the group to submit his or her own solution statements for the project. For example, the user may enter and arrange in a hierarchy of their choice a number of solution statements that constitute his or her solution to the group project. The user is free to make changes to his or her solution at any time, which includes removing a statement, adding a statement, reordering statements, and/or changing the hierarchy of statements. Each time the user makes such a change to his or her solution, the change may be transmitted to and recorded at the server 102 (see FIG. 1) and/or the group solution generator 226 (see FIG. 2). Accordingly, the group solution generator 226 and/or the primary and alternative group solution generator 230 may regenerate/update the primary and/or alternative group solutions based on the solution statement changes submitted by the user. These updated primary and/or alternative group solutions may be distributed and/or otherwise made available to one or more (or all) of the users of the group. In this fashion the group solutions may be continually revised and updated as changes are made to users' set of solutions.

In the example illustrated in FIG. 6, User A is the active user of the solution statement module 220 and currently has submitted statement V as his or her first solution statement followed by statement X as his or her second solution statement (i.e., statement X is ordered after statement V). User A also has additional solution statements $V_1$ and $V_2$ submitted hierarchically underneath statement V, and solution statements $X_1$ and Y hierarchically underneath statement X. User A is free to add additional solution statements, remove existing statements, and/or change the hierarchy and/or ordering pattern of his or her solution statements using the solution statement module 220.

The other users' solution statement module 222 enables the active user to view and select solution statements submitted by other users of the group. This allows the active user to also view the hierarchical structure of the solution statements submitted by his or her fellow group users. As described below, the active user can also select and submit solution statements from the solution statements displayed or otherwise made available in the other users' solution statement module 222. In the example illustrated in FIG. 6, the active user can see the solution statements submitted by Users B 602, C 604, D 606, etc.

The group solution module 224 enables the active user to view and select solution statements from primary and/or alternative group solutions generated by the primary and alternative group solution generator 230 (see FIG. 2). This allows the active user to also view the hierarchical structure of the group solutions' statements. As described below, the active user can also select and submit solution statements from the group solutions displayed or otherwise made available in the group solutions module 224. In the example illustrated in FIG. 6, the active user can see the primary group solution 608 and the alternative group solution 610.

The project solution interface 218 also allows the active user to import one or more solution statements from other users' solution statements 222 and/or from the group solutions 224 into his or her own solution statement module 220. This allows a user to quickly and conveniently submit his or her own solution based on the solution statements of other users and/or the group solution statements with which he or she supports or otherwise would submit as his or her own. In the example where the project solution interface 218 and its underlying modules 220, 222, 224 are software modules that are displayed on the user's client device 104*a*-104*d*, the user may "drag and drop" such solution statements from other users' solution statements 222 and/or from the group solutions 224 into his or her own solution statement module 220. The solution statements observed in the modules 220, 222, 224 may also have percentage use markers next to them indicating the percentage of users of the group (and/or a sub-group) that have included that specific solution statement in their set of solution statements.

Figure 16:
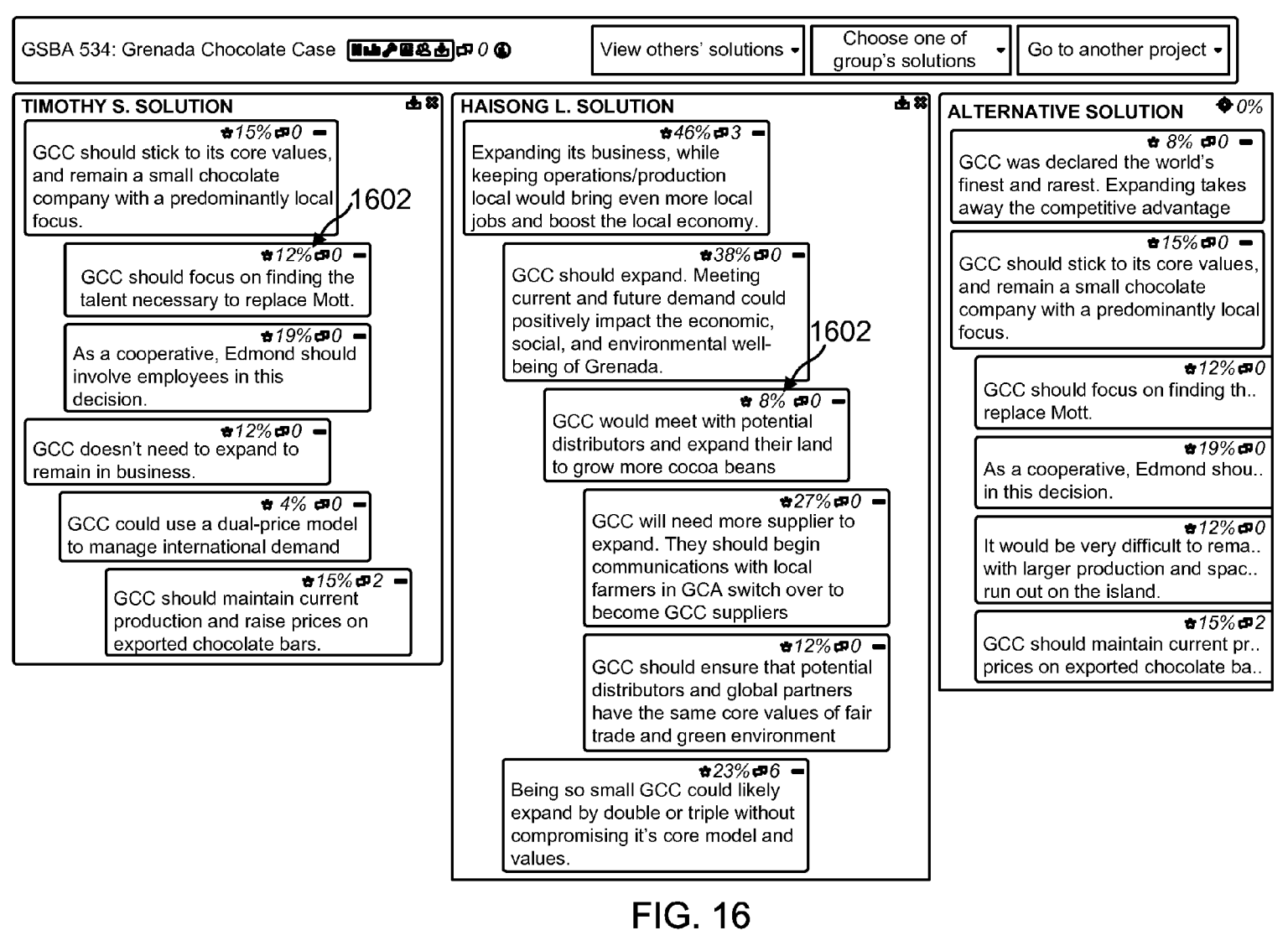

An exemplary project solution interface 218 is shown in FIG. 16 that may be displayed on the display of an active user's client device. The exemplary interface 218 shown includes some or all of the aforementioned features including the percentage use markers 1602 for each of the solution statements.

In one embodiment, the structure of the group solution may be determined by the most commonly observed hierarchical and ordering pattern observed in solution statements submitted by users in support of the specific group solution. Hence, the solution statement that is most frequently submitted on top of the solution hierarchy in users' solution statements may also be displayed on top of the hierarchical order of the group solution. Also, a solution statement that is most commonly submitted as preceding other statements may also be presented in the group solution as preceding those statement. When no pattern of structure is observed in user submitted solution statements, no hierarchy may be applied to the group solution and the statements may be presented in the order of their frequency of use.

For instance, referring to the example shown in FIG. 6, the solution statements of the primary group solution 608 may be hierarchically arranged and ordered to match the most commonly observed hierarchical and ordering pattern of the solution statements submitted by users in support of the primary group solution. For example, among those users whose sets of solution statements are consistent with the primary group solution (e.g., suppose Users A, C, and D in FIG. 3), it may be observed that the most common hierarchical and ordering pattern for the solution statements is that: statement V precedes statement X; statement $V_1$ is hierarchically underneath statement V; and statement $X_1$ is hierarchically underneath statement X. As such, the solution statements of the primary group solution 608 may be hierarchically and sequentially ordered (e.g., numerically ordered) to match this observation.

Similarly, the solution statements of the alternative group solution 610 may be hierarchically arranged and ordered to match the most commonly observed hierarchical and ordering pattern of the solution statements submitted by users in support of the alternative group solution. For example, among those users whose sets of solution statements are consistent with the alternative group solution (e.g., suppose Users b and E in FIG. 3), it may be observed that the most common hierarchical and ordering pattern for the solution statements is that: statement W precedes statement Z; and statement $W_1$ is hierarchically underneath statement W. As such, the solution statements of the alternative group solution 610 may be hierarchically and sequentially ordered (e.g., numerically ordered) to match this observation.

Thus, generally if a first solution statement (e.g., solution statement M) is most commonly found to be submitted by a group of users such that it is hierarchically above two or more other solution statements (e.g., solution statements N and O), then statement M may be arranged hierarchically above (i.e., be the parent of) both statements N and O in the group solution supported by the group of users. If statement N is most commonly found to be submitted within the group of users such that it is hierarchically above statement O, then statement N may be arranged hierarchically above (i.e., be the parent of) statement O in the group solution supported by the group of users. Similarly, if statement M is most commonly found to be submitted by the group of users such that it precedes statements N and O, then statement M may be arranged before both statements N and O in the group solution supported by the group of users. If statement N is most commonly found to be submitted by the group of users such that it precedes statement O, then statement N may be arranged before statement O in the group solution supported by the group of users. This process of hierarchically and sequentially ordering (e.g., numerically ordering) solution statements is not limited to three solution statements but instead applies to an unlimited number of solution statements.

As described above with respect to the suggested alternative solution wording module 232 of FIG. 2, semantic components of the user's submitted solution statements (or solution statements the user may attempt to submit or may be in the process of typing) may be analyzed. Based on this analysis, solution statements having the same or similar meaning but possibly different wording may be proposed to the user for inclusion/selection into his or her solution statement(s). This helps consolidate and minimize the number of solution statements that have same or similar meanings but may have been worded differently from competing against each other for insertion into the one or more group solutions.

Figure 7:
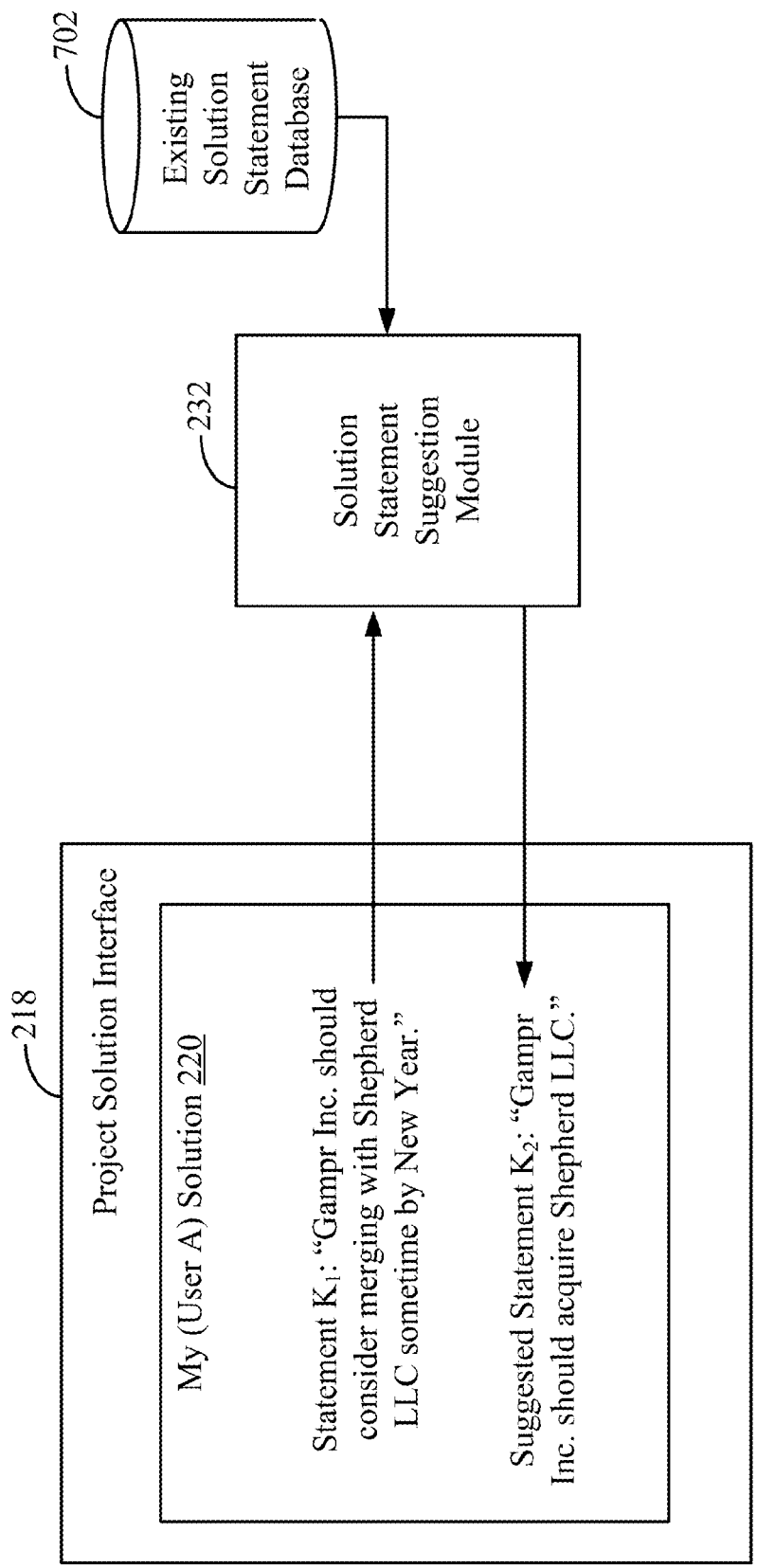
FIG. 7 illustrates a first exemplary process flow diagram between a solution statement suggestion module and other components of the system.

FIG. 7 illustrates a first exemplary process flow diagram between the solution statement suggestion module 232 and other components of the system 100 according to one example. A user (e.g., User A) may attempt to submit a solution statement $K_1$ that reads, "Gampr Inc. should consider merging with Shepherd LLC sometime by New Year." The solution statement suggestion module 232 may analyze statement $K_1$ along with all the other solution statements 702 submitted by other users in the group and determine that it is very close in meaning to an existing solution statement $K_2$ that reads, "Gampr Inc. should acquire Shepherd LLC." The module 232 may prompt the user with the statement $K_2$ and allow him or her to either accept the statement change or reject it. If the user accepts and selects the suggested solution statement, then his or her original solution statement (e.g., statement $K_1$) is replaced with the suggested statement (e.g., statement $K_2$). If the user rejects the suggested solution statement, the original statement (e.g., statement $K_1$) remains unchanged. The solution statement suggestion module 232 may rely on a preselected wording similarly threshold value to determine what level of closeness between two statements causes the module 232 to prompt a user with a suggested alternative.

According to one embodiment, the solution statement suggestion module 232 analyzes the semantic similarity of the solution statement the user is typing in real time to other existing solution statements and prompts the user with one or more of the alternative statements (e.g., statement $K_2$) that are similar. In addition to the alternative statement, the user may also be prompted with the amount of user support (e.g., the percentage of users adopting the solution statement such as the percentage 1602 shown in FIG. 16) the alternative statement has among users of the group. The user may then select the alternative statement rather than continue typing out his or her originally intended solution statement. This helps promote adoption of a group solution.

The solution statement suggestion module 232 may also go back to users who originally submitted a solution statement and prompt him or her with a suggested alternative if subsequently submitted user solution statements have a same or similar meaning but a consistently different wording. For example, User A shown in FIG. 7 may have originally submitted solution statement $K_1$ without any alternative being suggested by the solution statement suggestion module 232 at that time because, for example, User A may have been one of the first users of the group to submit a solution statement.

However, a plurality of subsequent users may have since submitted solution statement $K_2$, which has a very similar meaning to $K_1$ but has different wording. The solution statement suggestion module 232 may determine that the majority of users who submitted a statement with a same or similar meaning to statements $K_1$ and $K_2$ submitted/selected statement $K_2$ and only a minority of users submitted statement $K_1$. Consequently, the solution statement suggestion module 232 may go back and prompt the minority of users (e.g., like User A) who submitted statement $K_1$ with the option of replacing it with the alternative wording statement $K_2$. In this fashion, users may "select" solution statements to be part of their own set of solution statements. Whether a solution statement is "submitted" or "selected" matters little in terms of group solution generation and whenever an algorithm conducts processes on or based on a "submitted" statement, the same processes may be performed by the algorithm on or based on "selected" statements.

Figure 8:
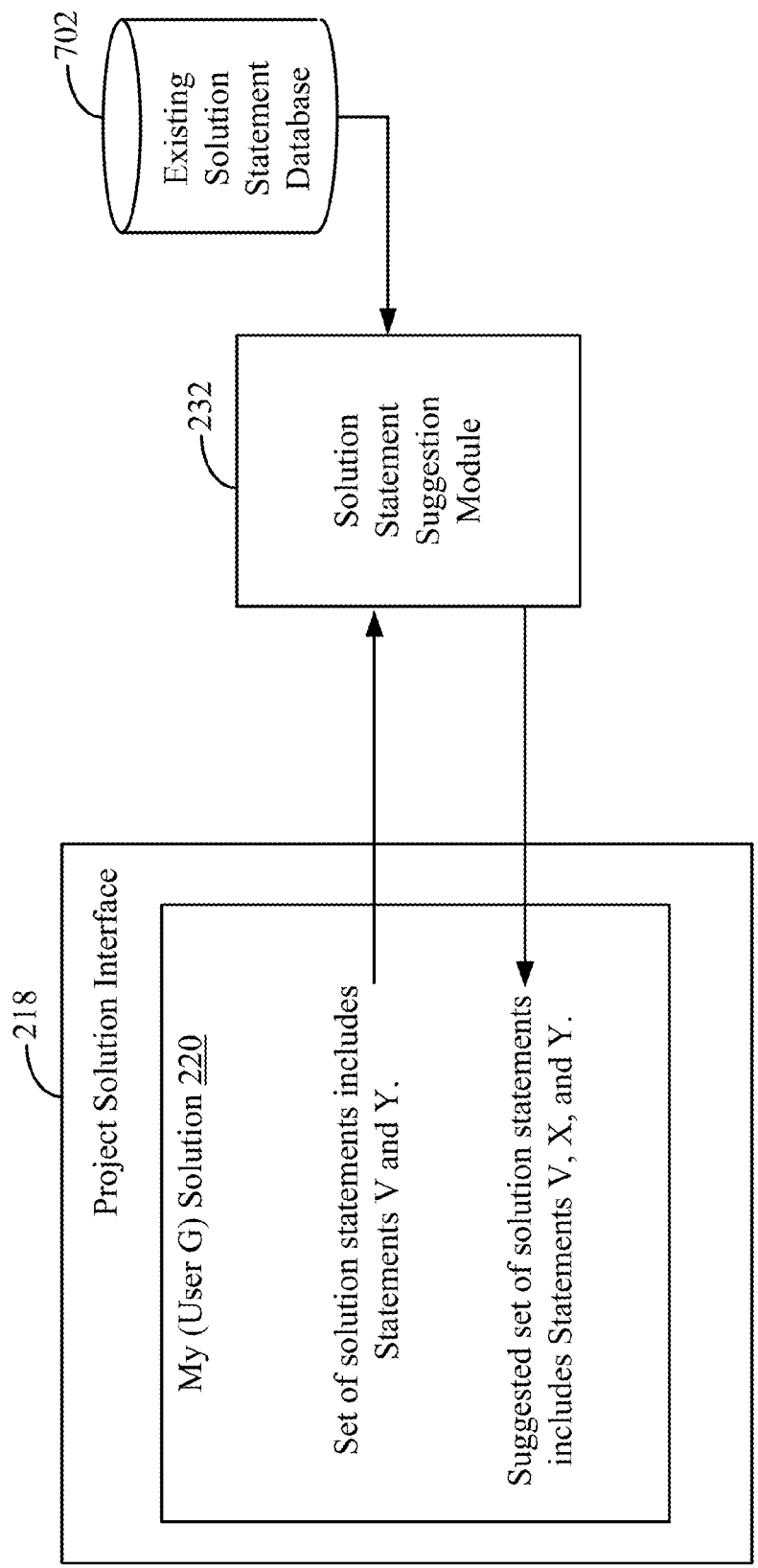
FIG. 8 illustrates a second exemplary process flow diagram between a solution statement suggestion module and other components of the system.

FIG. 8 illustrates a second exemplary process flow diagram between the solution statement suggestion module 232 and other components of the system 100 according to another example. A user (e.g., User G) may submit or attempt to submit (e.g., User G is in the process of typing out his or her solution statements prior to submitting) a set of solution statements that includes statements V and Y (see e.g. the solution statement table of FIG. 3). The solution statement suggestion module 232 may determine that these statements are also included in whole or in part in the sets of solution statements of a well-defined group of other users such as Users A, C, and D of FIG. 3 (e.g., like User G, Users A, C, and D submitted statement V and user A submitted both statements V and Y). In so doing the solution statement suggestion module 232 may determine that there is a chance that User G may have unintentionally left out solution statement X, which was also included in the sets of solution statements submitted by Users A, C, and D. The module 232 may then prompt User G as to whether he or she would like to add solution statement X to his or her set of solution statements. User B is then free to decide whether or not to include the suggested solution statement X.

In one embodiment, the solution statement suggestion module 232 may suggest inclusion of the possibly omitted solution statement based on a probabilistic determination as to whether the calculated likelihood of the statement(s) (e.g., statement X) having been omitted by mistake exceeds a predefined threshold (e.g., omission likelihood threshold). This omission likelihood threshold may be based on, among other things: how many solution statements of the active user (e.g., User G in the above example) match the solution statements of the other group of users (e.g., Users A, C, and D in the above example); what and/or how many solution statements of the other group of users were not submitted by the active user; how large the other group of users are; etc.

Figure 9:
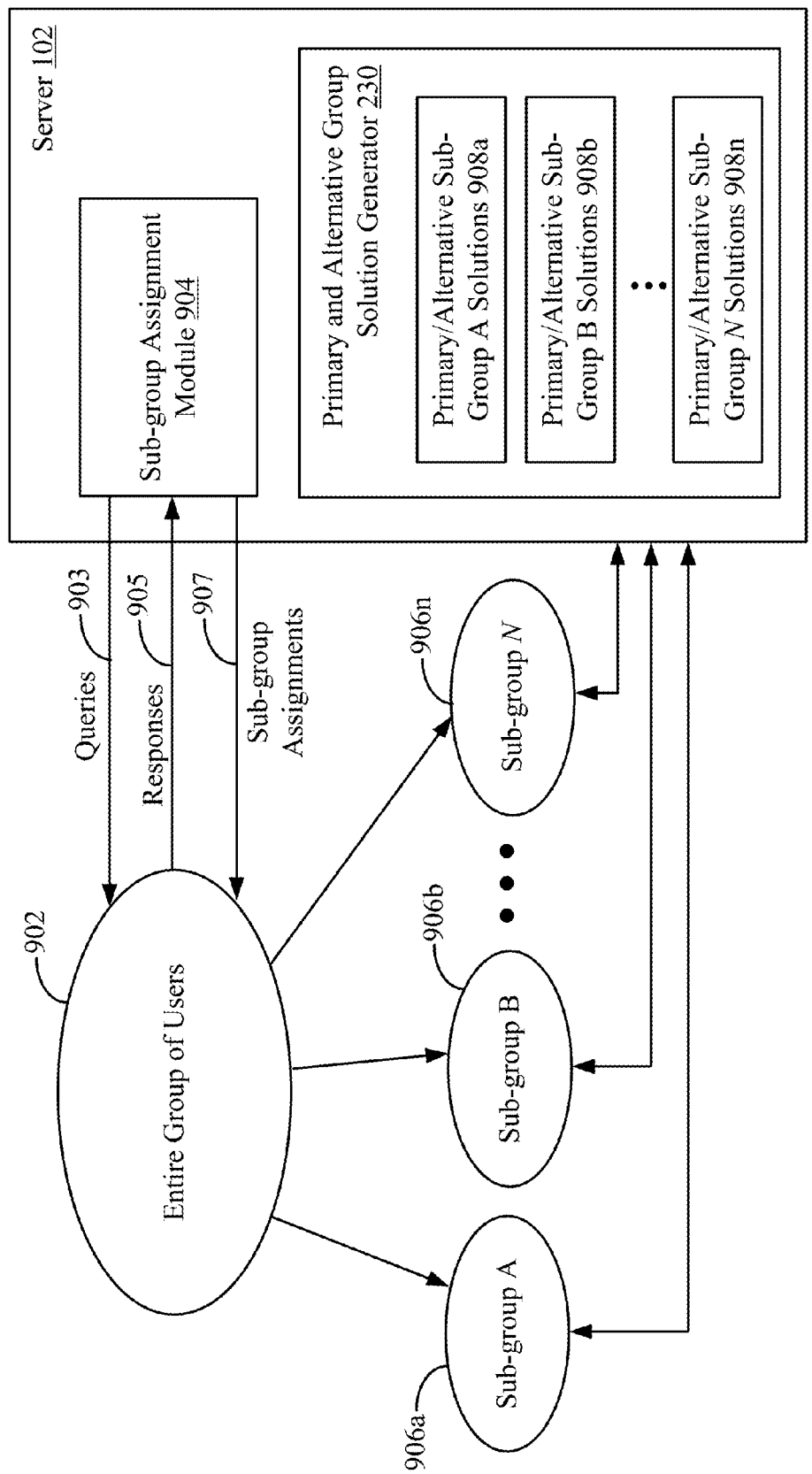
FIG. 9 illustrates a schematic block diagram of how users of a group may be assigned to sub-groups.

FIG. 9 illustrates a schematic block diagram of how users of a group may be assigned to sub-groups according to one embodiment of the present disclosure. Referring to FIGS. 1 and 9, each user making up the entire group of users 902 tasked to a project may be sent queries 903 from the server 102 (see FIG. 1) and/or a sub-group assignment module 904. The queries 903 may ask the users for information such as but not limited to education level, gender, domicile, birthplace, age, other characteristics, etc. The specific queries/questions asked of the users may be controlled by the solution manager. The server 102 and/or the sub-group assignment module 904 may then receive responses 905 to the queries from each of the users. Based on the responses received, the server 102 and/or the sub-group assignment module 904 may send back to each user a sub-group assignment 907 assigning each user to a sub-group 906a, 906b, . . . , 906n based on the characteristics reported and/or some other controls of the solution manager. Alternatively, the server 102 and/or the sub-group assignment module 904 may internally categorize each user into the sub-group 906a, 906b, . . . , 906n with or without the user knowing that he or she has been assigned to a subgroup 906a, 906b, . . . , 906n.

Once users have been assigned and/or categorized into sub-groups, the server 102 and/or the primary and alternative group solution generator 230 may generate primary and/or alternative group solutions according to the group solution generation algorithms described herein (e.g., FIGS. 4 and 5, etc.) for each sub-group. Thus, the server 102 and/or the primary and alternative group solution generator 230 may generate a primary and/or alternative group solution for sub-group A 906a based on the set of solution statements submitted by each of the users belonging only to sub-group A 906a. Similarly, the server 102 and/or the primary and alternative group solution generator 230 may generate primary and/or alternative group solutions for the other sub-groups 906b, . . . , 906n based on the set of solution statements submitted by the users only belonging to each of those sub-groups 906b, . . . 906n. Moreover, if a user within a sub-group 906a, 906b, . . . , 906n makes a change to one of his or her solution statement(s), the primary and/or alternative group solutions 908a, 908b, . . . , 908n may be recalculated and distributed only to that sub-group while the group solutions for the other sub-groups may remain unchanged. For example, a change to a solution statement within sub-group A 906A may cause the primary and/or alternative group solution 908a for sub-group A to be recalculated and distributed to the users of sub-group A while the group solutions 908b, 908n for the other sub-groups may remain unchanged.

Figure 10:
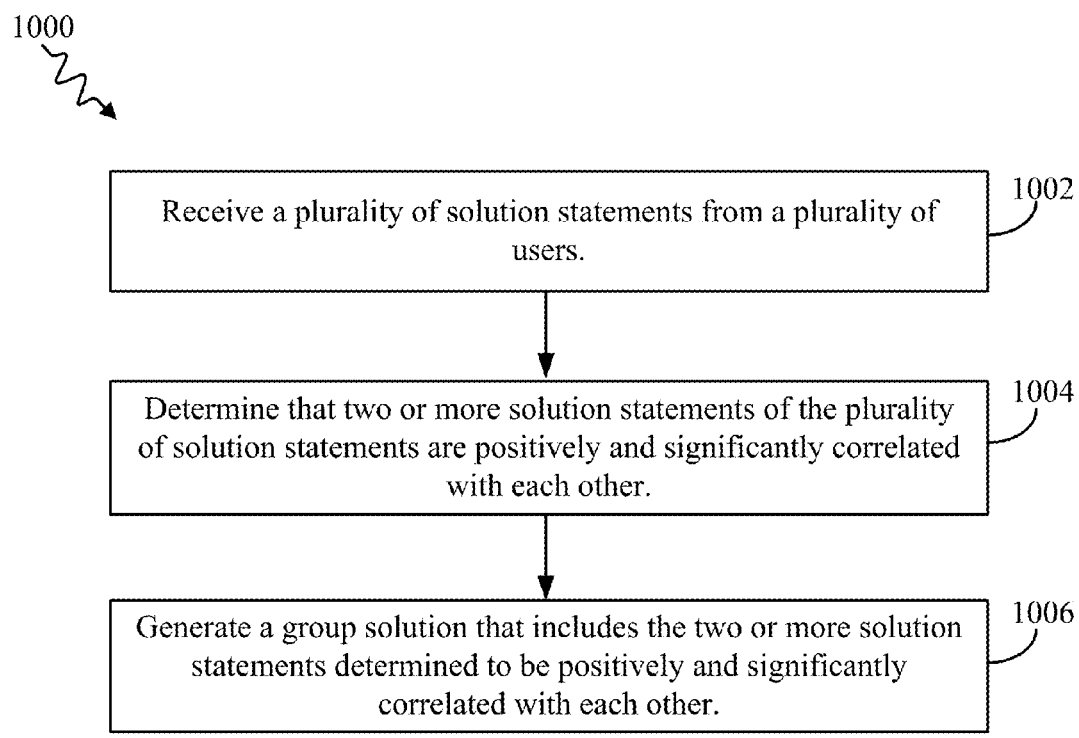

FIG. 10 illustrates a method 1000 for generating group solutions to a project for which a plurality of users are tasked to submit solution statements and find a solution to. First, a plurality of solution statements are received from a plurality of users 1002. Next, two or more solution statements of the plurality of solution statements are determined to have a positive correlation with each other 1004. Then, a group solution that includes the two or more solution statements determined to have a positive correlation with each other is generated 1006. The group solution generated may then be provided to one or more of the plurality of users.

Figure 11:
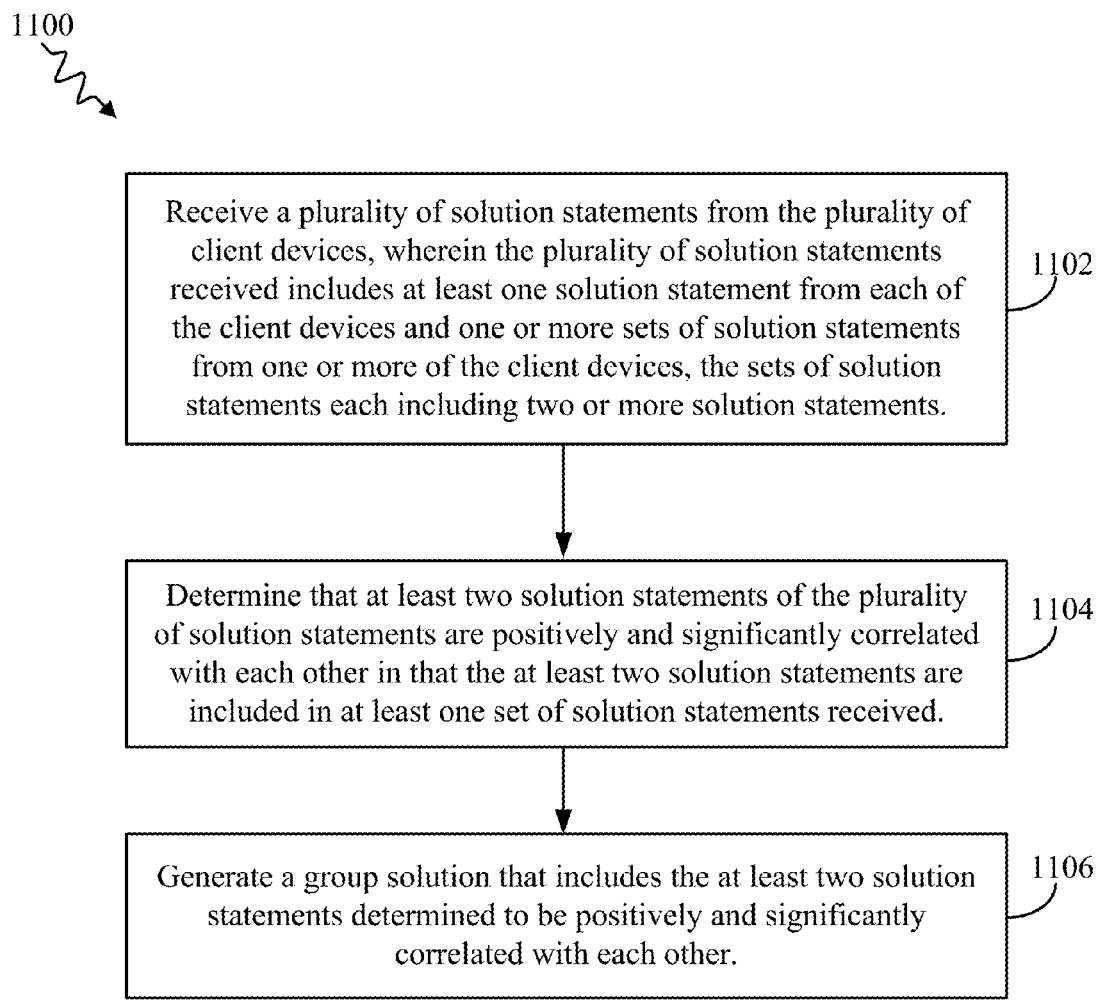

FIG. 11 illustrates a method 1100 for generating group solutions to a project for which a plurality of users having a client device are tasked to submit solution statements and find a solution to. First, a plurality of solution statements are received from a plurality of client devices, wherein the plurality of solution statements received includes at least one solution statement from each of the client devices and one or more sets of solution statements from one or more of the client devices, the sets of solution statements each including two or more solution statements 1102. Next, it is determined that at least two solution statements of the plurality of solution statements have a positive correlation with each other in that the at least two solution statements are included in at least one set of solution statements received 1104. Then, a group solution that includes the at least two solution statements determined to have a positive correlation with each other is generated 1106. The group solution generated may then be provided to one or more of the plurality of users and/or the client devices.

Figure 12:
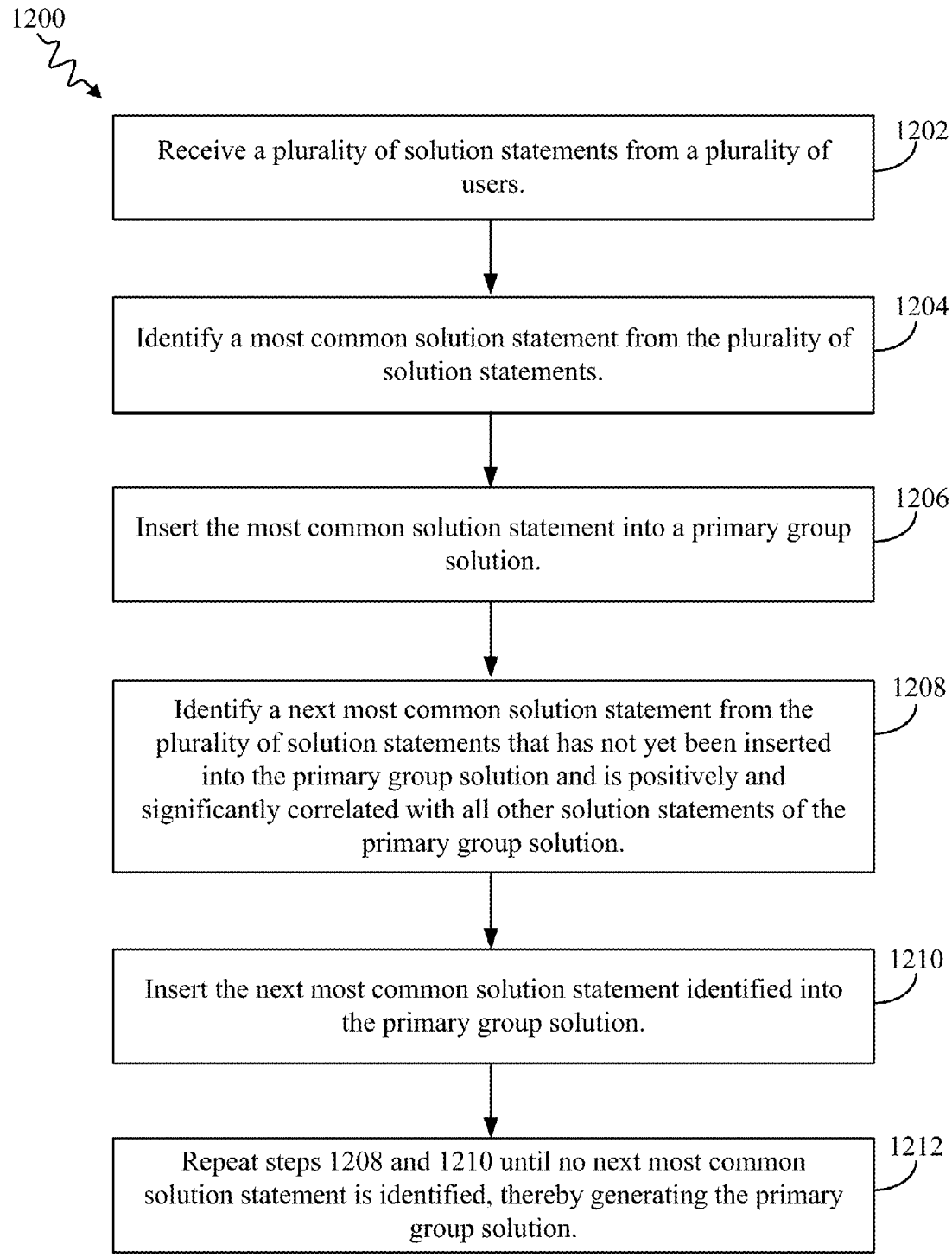

FIG. 12 illustrates a method 1200 for generating group solutions to a project for which a plurality of users are tasked to submit solution statements and find a solution to. First, a plurality of solution statements are received from a plurality of users 1202. Next, a most common solution statement from the plurality of solution statements is identified 1204. Then, the most common solution statement is inserted into a primary group solution 1206. Next, a next most common solution statement is identified from the plurality of solution statements that has not yet been inserted into the primary group solution and is positively correlated with all other solution statements of the primary group solution 1208. Then, the next most common solution statement identified is inserted into the primary group solution 1210. Next, steps 1208 and 1210 are repeated until no next most common solution statement is identified, thereby generating the primary group solution 1212. The primary group solution generated may then be provided to one or more of the plurality of users.

Figure 13:
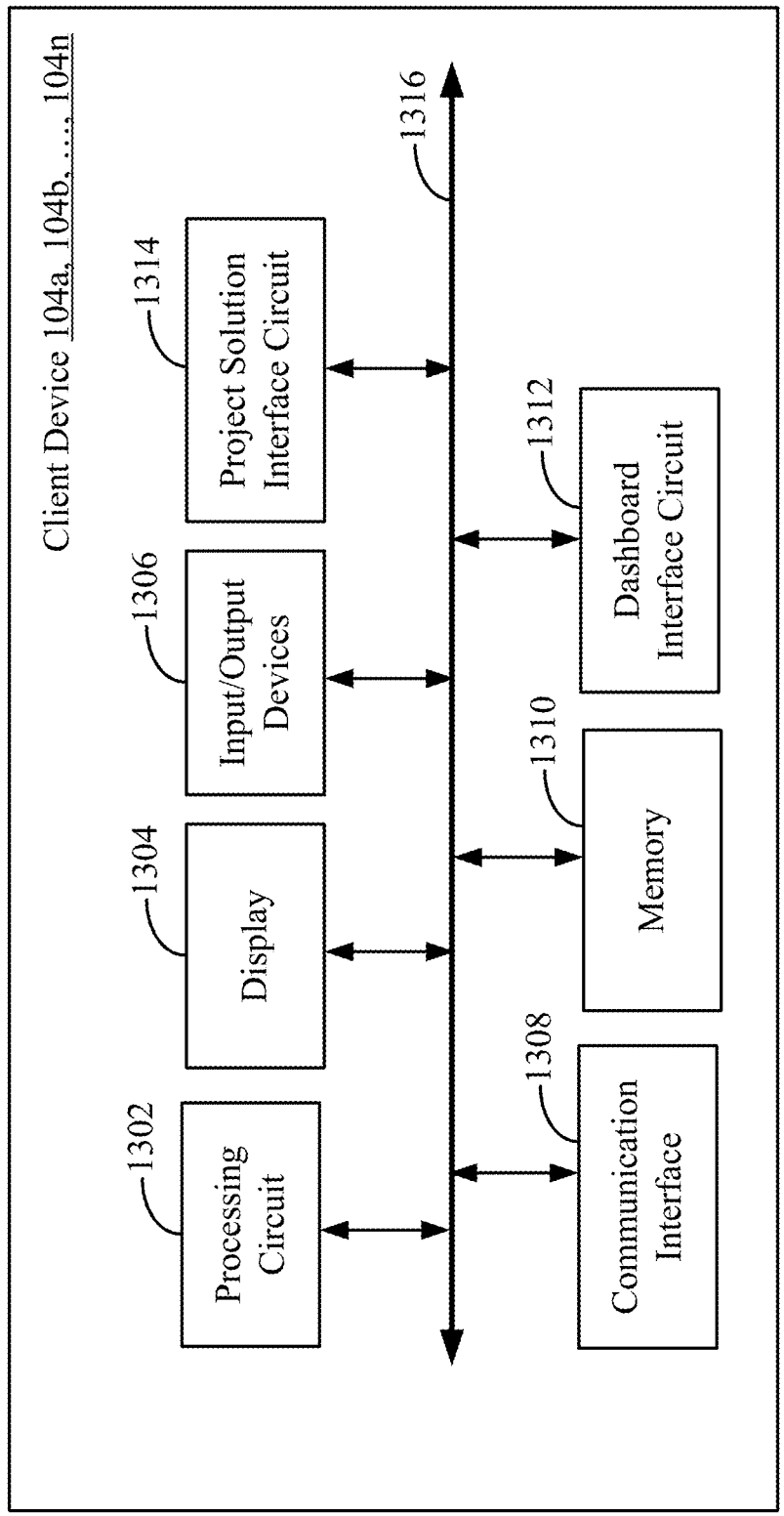
FIG. 13 illustrates a schematic block diagram of a client device.

FIG. 13 illustrates a schematic block diagram of the client device 104*a*, 104*b*, . . . , 104*n* according to one embodiment. The client device 104*a*, 104*b*, . . . , 104*n* may include a processing circuit 1302, a display 1304, an input/output (I/O) device(s) 1306, a communication interface 1308, a memory circuit 1310, a dashboard interface circuit 1312, and/or a project solution interface circuit 1314. The one or more components and circuits 1302, 1304, 1306, 1308, 1310, 1312, 1314 may be communicatively coupled to each other directly and/or via a bus 1316.

Referring to FIGS. 2, 6, 7, and 13, the display 1304 displays to the user of the client device 104*a*, 104*b*, . . . , 104*n*, among other things, the dashboard interface 210, the project solution interface 218, the user's submitted solution statements, any and all group solution statements, and/or other users' solution statements. The I/O device 1306 may include touchscreens, mouse, keyboards, and/or other input/output devices. For example, the I/O device 1306 may receive the user's typed solution statements using an alphanumeric keyboard and/or touchscreen. The communication interface 1308 may be a wired and/or wireless communication interface that allows the client device 104*a*, 104*b*, . . . , 104*n* to communicate (e.g., transmit and receive data) with the server 102 and in some cases other client devices 104*a*, 104*b*, . . . , 104*n*. The memory circuit 1310 may be volatile and/or non-volatile memory that can store, among other things, program/application instructions for execution by the processing circuit 1302, solution statements, and other data pertaining to the system 100.

The dashboard interface circuit 1312 may be a specialized processor (e.g., an application specific integrated circuit (ASIC)) that can generate the dashboard interface 210 for display on the display 1304. Thus, the dashboard interface circuit 1312 is a means for enabling a user to perform at least one of: view and select one or more projects accessible to the user; view and select one or more groups the user is part of; and/or search for terms within one or more projects accessible to the user. The project solution interface circuit 1314 may be a specialized processor (e.g., an ASIC) that can generate the project solution interface 218 for display on the display 1304. Thus, the project solution interface circuit 1314 is a means for enabling a user to perform at least one of: view, submit, and/or modify one or more of their own solution statements provided to and received at the server; view one or more solution statements associated with other users of the plurality of users; view the group solution; select at least one of a solution statement associated with another user of the plurality of users as their own solution statement; and/or transmit the selected solution statement to the server.

Figure 14:
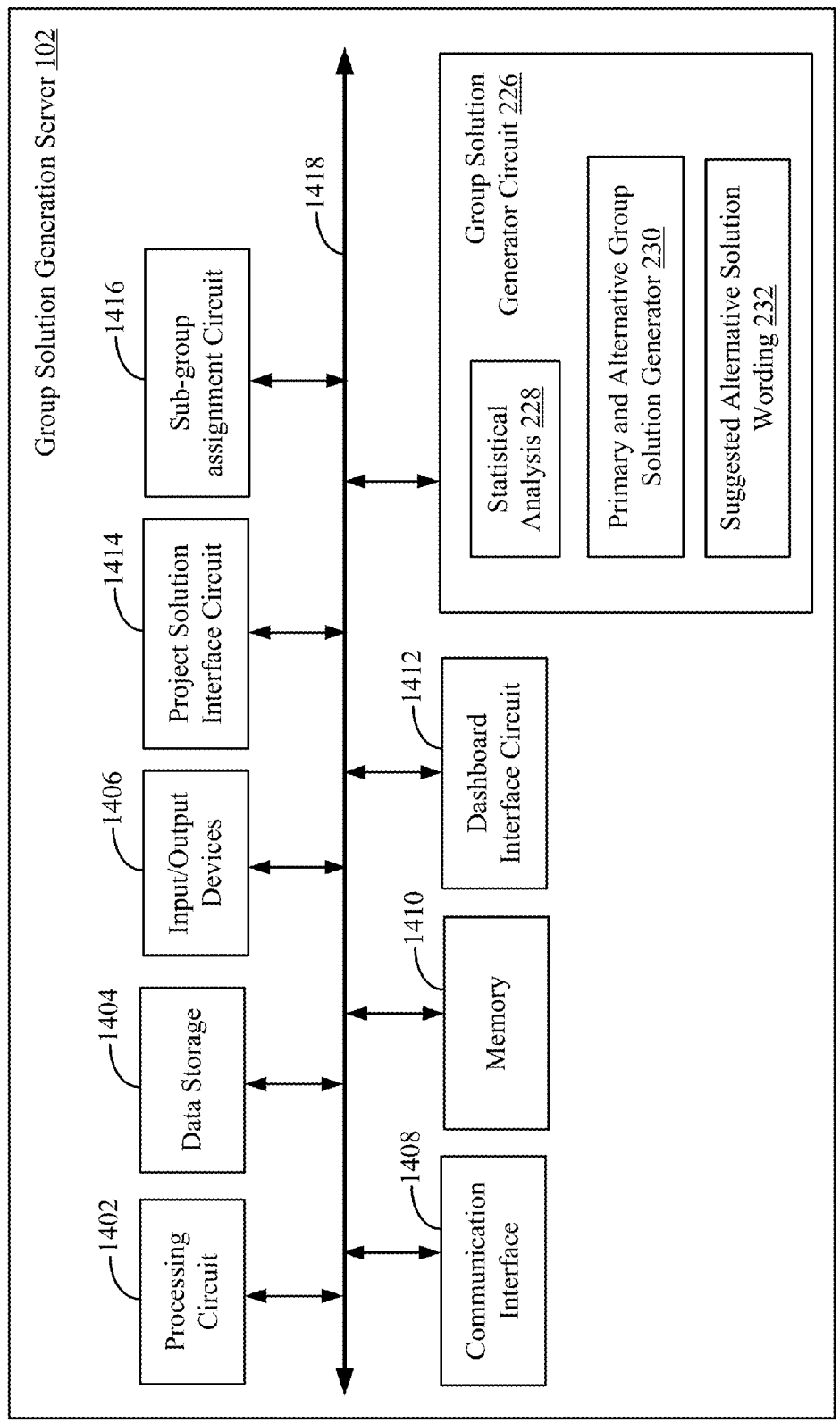
FIG. 14 illustrates a schematic block diagram of a group solution generation server.

FIG. 14 illustrates a schematic block diagram of the group solution generation server 102 according to one embodiment. The server 102 may include a processing circuit 1402, a data storage device 1404, an input/output (I/O) device(s) 1406, a communication interface 1408, a memory circuit 1410, a dashboard interface circuit 1412, a project solution interface circuit 1414, a sub-group assignment circuit 1416, and/or the group solution generator circuit 226, which may include the statistical analysis circuit 228, the primary and alternative group solution generator circuit 230, and/or the suggest alternative solution wording circuit 232. The one or more components and circuits 1402, 1404, 1406, 1408, 1410, 1412, 1414, 226, 228, 230, 232 may be communicatively coupled to each other directly and/or via a bus 1418.

Referring to FIGS. 2, 6, 7, and 14, the data storage device 1404 may include the data storage element 208 (see FIG. 2) and/or the solution statement database 702. Thus, the data storage device 1404 may comprise non-volatile memory such as but not limited to storage disks/drives, etc. and is configured to store a plurality of solution statements received from users, group solutions (e.g., primary and alternative), user responses to queries including but not limited to user characteristics and user data, etc. The I/O device 1406 may include touchscreens, mouse, keyboards, and/or other input/output devices. For example, the I/O device 1406 may receive commands from a solution manager. The communication interface 1408 may be a wired and/or wireless communication interface that allows the server to communicate (e.g., transmit and receive data) with the client devices 104*a*, 104*b*, . . . , 104*n*. The memory circuit 1410 may be volatile and/or non-volatile memory that can store, among other things, program/application instructions for execution by the processing circuit 1402.

The dashboard interface circuit 1412 may be a specialized processor (e.g., an ASIC) that can generate the dashboard interface 210 for display on client devices 104*a*, 104*b*, . . . , 104*n*. Thus, the dashboard interface circuit 1412 is a means for providing a plurality of users with a dashboard interface that can be displayed on a display of a client device associated with each of the plurality of users, where the dashboard interface enables each of the plurality of users to perform at least one of: view and select one or more projects accessible to the user; view and select one or more groups the user is part of; and/or search for terms within one or more projects accessible to the user.

The project solution interface circuit 1414 may be a specialized processor (e.g., an ASIC) that can generate the project solution interface 218 for display on client devices 104*a*, 104*b*, . . . , 104*n*. Thus, the project solution interface circuit 1414 is a means for providing the plurality of users with a project solution interface configured to be displayed on a display of a client device 104*a*, 104*b*, . . . 104*n* associated with each of the plurality of users, where the project solution interface enables each of the plurality of users to perform at least one of: at least one of view, submit, and/or modify one or more of their own solution statements provided to and received at the server; view one or more solution statements associated with other users of the plurality of users; select at least one of a solution statement associated with another user of the plurality of users as their own solution statement; and/or transmit the selected solution statement to the server 102.

The sub-group assignment circuit 1416 may be a specialized processing circuit (e.g., an ASIC) that can assign users to various sub-groups based on responses to queries that the users have answered. Thus, the sub-group assignment circuit 1416 is one example of: a means for transmitting one or more queries to a plurality of users; a means for receiving one or more responses to the one or more queries from the plurality of users; a means for assigning at least a portion of the plurality of users to a plurality of sub-groups based on the one or more responses received; a means for generating a first sub-group solution based on the solution statements received from a first sub-group of users of the plurality of users assigned to a first sub-group; and/or a means for generating a second sub-group solution based on the solution statements received from a second sub-group of users assigned to a second sub-group.

The primary and alternative group solution generator circuit 230 and/or the group solution generator circuit 226 may be a specialized processing circuit (e.g., an ASIC) that can generate primary group solutions and alternative group solutions based on the solution statements for a project provided by a plurality of users/client devices associated with the project. Thus, the primary and alternative group solution generator circuit 230 and/or the group solution generator circuit 226 may each be one example of: a means for receiving a plurality of solution statements from a plurality of users; a means for determining that two or more solution statements of the plurality of solution statements are positively and significantly correlated with each other; and a means for generating a group solution that includes the two or more solution statements determined to be positively and significantly correlated with each other. The primary and alternative group solution generator circuit 230 and/or the group solution generator circuit 226 may also each be one example of: a means for receiving a plurality of solution statements from the plurality of client devices, wherein the plurality of solution statements received includes at least one solution statement from each of the client devices and one or more sets of solution statements from one or more of the client devices, the sets of solution statements each including two or more solution statements; a means for determining that at least two solution statements of the plurality of solution statements are positively and significantly correlated with each other in that the at least two solution statements are included in at least one set of solution statements received; and a means for generating a group solution that includes the at least two solution statements determined to be positively and significantly correlated with each other. The primary and alternative group solution generator circuit 230 and/or the group solution generator circuit 226 may also each be one example of: a means for (a) receiving a plurality of solution statements from a plurality of users; a means for (b) identifying a most common solution statement from the plurality of solution statements; a means for (c) inserting the most common solution statement identified in (b) into a primary group solution; a means for (d) identifying a next most common solution statement from the plurality of solution statements that has not yet been inserted into the primary group solution and is positively and significantly correlated with all other solution statements of the primary group solution; a means for (e) inserting the next most common solution statement identified in (d) into the primary group solution; and a means for repeating (d) and (e) until no next most common solution statement is identified, thereby generating the primary group solution.

One or more of the components, steps, features, and/or functions illustrated in FIGS. 1, 2, 3, 4, 5, 6, 7, 8, 9, 10, 11, 12, 13, 14, 15, and/or 16 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 2, 6, 7, 8, 9, 13, and/or 14 may be configured to perform one or more of the methods, features, or steps described in FIGS. 2, 3, 4, 5, 7, 8, 9, 10, 11, 12, 15, and/or 16. The algorithms described herein may also be efficiently implemented in software and/or embedded in hardware.

Moreover, in one aspect of the disclosure, the processing circuit 1402 illustrated in FIG. 14 may be a specialized processor (e.g., ASIC) that is specifically designed and/or hardwired to perform the algorithms, methods, and/or steps described in FIGS. 2, 3, 4, 5, 7, 8, 9, 10, 11, 12, 15, and/or 16. Thus, such a specialized processor (e.g., ASIC) may be one example of a means for executing the algorithms, methods, and/or steps described in FIGS. 2, 3, 4, 5, 7, 8, 9, 10, 11, 12, 15, and/or 16.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing or containing instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A non-transitory computer-readable storage medium having instructions for generating group solutions stored thereon, the instructions which when executed by at least one processor causes the processor to:
   (a) receive a plurality of solution statements from a plurality of users;
   (b) identify a most common solution statement from the plurality of solution statements, the most common solution statement received from a subset of users of the plurality of users;
   (c) insert the most common solution statement identified in (b) into a primary group solution;
   (d) identify a next most common solution statement from solution statements received from the subset of users that has not yet been inserted into the primary group solution;
   (e) determine that the next most common solution statement is statistically positively and significantly correlated with all solution statements of the primary group solution by determining that a first correlation value between the next most common solution statement and the solution statements of the primary group solution is greater than or equal to a preselected positive correlation threshold value, and wherein the next most common solution statement has a substantively different meaning than all other solution statements of the primary group solution;
   (f) insert the next most common solution statement into the primary group solution;
   (g) generate the primary group solution by repeating (d), (e), and (f) until no next most common solution statement is identified;
   (h) identify one or more solution statements of the plurality of solution statements that are statistically negatively and significantly correlated to the most common solution statement;
   (i) identify and insert a most common negatively correlated solution statement from the one or more solution statements identified in (h) into an alternative group solution;
   (j) identify a next most common negatively correlated solution statement from the solution statements identified in (h) that has not yet been inserted into the alternative group solution;
   (k) determine that the next most common negatively correlated solution statement is statistically positively and significantly correlated with all solution statements of the alternative group solution;
   (l) insert the next most common negatively correlated solution statement into the alternative group solution; and
   (m) generate the alternative group solution by repeating (j), (k), and (l) until no next most common negatively correlated solution statement is identified.

2. The non-transitory computer-readable storage medium of claim 1, wherein the instructions when executed by the processor causing the processor to determine that the next most common solution statement is statistically positively and significantly correlated with all solution statements of the primary group solution includes:
   determine that the next most common solution statement and all solution statements of the primary group solution are included concurrently in at least one of the plurality of solution statements received from one or more of the users of the subset of users.

3. The non-transitory computer-readable storage medium of claim 1, wherein receiving the plurality of solution statements from the plurality of users includes:
   receive from each of the plurality of users at least one solution statement of the plurality of solution statements; and
   receive from at least one or more of the plurality of users a set of solution statements that includes two or more solution statements from the plurality of solution statements.

4. The non-transitory computer-readable storage medium of claim 1, wherein the instructions when executed by the processor causing the processor to determine that the next most common solution statement is statistically positively and significantly correlated with all solution statements of the primary group solution by determining that the first correlation value between the next most common solution statement and the solution statements of the primary group solution is greater than or equal to the preselected positive correlation threshold value includes:
   determine that the first correlation value has a confidence interval that is greater than or equal to a preselected confidence interval threshold value.

5. The non-transitory computer-readable storage medium of claim 1, wherein the plurality of solution statements, primary group solution, and the alternative group solution are directed at providing solutions to a project that the plurality of users are attempting to solve.

6. The non-transitory computer-readable storage medium of claim 1, wherein the instructions when executed by the processor further cause the processor to:
receive a first solution statement of the plurality of solution statements from a first user of the plurality of users;
analyze semantics of the first solution statement and determine that the first solution statement is similar in meaning to a second solution statement of the plurality of solution statements, the second solution statement having been received by a greater number of users than the first solution statement; and
prompt the first user to replace the first solution statement with the second solution statement.

7. The non-transitory computer-readable storage medium of claim 1, wherein the instructions when executed by the processor further cause the processor to:
transmit one or more queries to the plurality of users;
receive one or more responses to the one or more queries from the plurality of users; and
assign at least two or more of the plurality of users to a plurality of sub-groups based on the one or more responses received.

8. The non-transitory computer-readable storage medium of claim 7, wherein the instructions when executed by the processor further cause the processor to:
generate at least a first sub-group solution based on the solution statements received from a first sub-group of users of the plurality of users assigned to a first sub-group; and
generate at least a second sub-group solution based on the solution statements received from a second sub-group of users assigned to a second sub-group.

9. The non-transitory computer-readable storage medium of claim 1, wherein the instructions when executed by the processor further cause the processor to:
receive one or more changes to one or more solution statements received from at least one user of the plurality of users; and
regenerate at least one of the primary group solution and/or the alternative group solution based on the one or more changes received.

10. The non-transitory computer-readable storage medium of claim 9, wherein the instructions when executed by the processor further causing the processor to regenerate at least one of the primary group solution and/or the alternative group solution based on the one or more changes received includes:
determine that at least one of the changed solution statements and at least one other solution statement of the plurality of solution statements are statistically positively and significantly correlated with each other; and
regenerate the group solution to include the at least one changed solution statement and the at least one other solution statement of the plurality of solution statements determined to be statistically positively and significantly correlated with each other.

11. The non-transitory computer-readable-storage medium of claim 1, wherein the instructions when executed by the processor further cause the processor to:
provide at least one of the primary group solution and/or the alternative group solution to at least a portion of the plurality of users.

12. The non-transitory computer-readable storage medium of claim 1, wherein the instructions when executed by the processor further cause the processor to:
grant a license to select users of the plurality of users, the license allowing the select users to at least one of view other user solution statements, view the primary group solution, view the alternative group solution, and/or receive updates to the primary group solution and the alternative group solution.

13. A server comprising:
a communication interface configured to communicate with a plurality of client devices;
a processing circuit communicatively coupled to the communication interface, the processing circuit configured to:
(a) receive a plurality of solution statements from the plurality of client devices, wherein the plurality of solution statements received includes at least one solution statement from each of the client devices;
(b) receive a set of solution statements from one or more client devices of the plurality of client devices, wherein each set of solution statements received from a client device includes two or more solution statements of the plurality of solution statements;
(c) identify a most common solution statement from the plurality of solution statements, the most common solution statement received from a subset of users of the plurality of users;
(d) identify one or more solution statements of the plurality of solution statements that are statistically negatively and significantly correlated to the most common solution statement;
(e) insert the most common solution statement identified in (c) into a primary group solution;
(f) identify and insert a most common negatively correlated solution statement from the one or more solution statements identified in (d) into an alternative group solution;
(g) identify a next most common solution statement from solution statements received from the subset of users that has not yet been inserted into the primary group solution;
(h) determine that the next most common solution statement is statistically positively and significantly correlated with all solution statements of the primary group solution, and wherein the next most common solution statement has a substantively different meaning than all other solution statements of the primary group solution;
(i) insert the next most common solution statement into the primary group solution;
(j) generate the primary group solution by repeating (g), (h), and (i) until no next most common solution statement is identified;
(k) identify a next most common negatively correlated solution statement from the solution statements identified in (d) that has not yet been inserted into the alternative group solution;
(l) determine that the next most common negatively correlated solution statement is statistically positively and significantly correlated with all solution statements of the alternative group solution;
(m) insert the next most common negatively correlated solution statement into the alternative group solution; and
(n) generate the alternative group solution by repeating (k), (l), and (m) until no next most common negatively correlated solution statement is identified.

14. The server of claim 13, wherein the processing circuit is further configured to:
provide the plurality of users with a project solution interface, the project solution interface configured to be displayed on a display of a client device associated with each of the plurality of users, the project solution interface enabling each of the plurality of users to perform at least one of:
at least one of view, submit, and/or modify one or more of their own solution statements provided to and received at the server;
view one or more solution statements associated with other users of the plurality of users; and/or
view at least one of the primary group solution and/or the alternative group solution.

15. The server of claim 14, wherein the project solution interface further enables each of the plurality of users to:
select at least one of a solution statement associated with another user of the plurality of users as their own solution statement; and
transmit the selected solution statement to the server.

16. The server of claim 14, wherein the processing circuit is further configured to:
determine popularity percentage values for one or more of the solution statements of the plurality of solution statements, the popularity percentage values indicating the percentage of the plurality of users that submitted the one or more solution statements to the server, and wherein the popularity percentage values are displayed within the project solution interface for at least one of:
(a) the one or more of their own solution statements provided to and received at the server;
(b) the one or more solution statements associated with other users of the plurality of users; and/or
(c) at least one of the primary group solution and/or the alternative group solution.

17. The server of claim 13, wherein the processing circuit is further configured to:
provide the plurality of users with a dashboard interface, the dashboard interface configured to be displayed on a display of a client device associated with each of the plurality of users, the dashboard interface enabling each of the plurality of users to perform at least one of:
view and select one or more projects accessible to the user;
view and select one or more groups the user is part of; and/or
search for terms within one or more projects accessible to the user.

18. The server of claim 13, wherein the processing circuit is further configured to perform at least one of the following processes:
determine the average use of each solution statement among the plurality of users;
determine a correlation among solution statement use across the plurality of users based on user characteristics received from the plurality of users;
rate a semantic similarity of solution statements in relation to other solution statements;
group solution statements of the plurality of solution statements together based on their rated semantic similarity;
tag portions of a solution statement of the plurality of solution statements by identifying key words characterizing the solution statement; and/or
link one or more solution statements submitted by a user of the plurality of users to at least one of their user name and/or user profile.

19. The server of claim 13, wherein the processing circuit is further configured to:
receive a first set of solution statements from a first user of the plurality of users;
compare the first set of solution statements received to sets of solution statements received from other users of the plurality of users;
determine that the first set of solution statements does not include at least one solution statement included in the sets of solution statements received from the other users; and
prompt the first user to add the at least one solution statement included in the sets of solution statements received from the other users.

20. The server of claim 13, wherein the processing circuit adapted to determine that the next most common solution statement is statistically positively and significantly correlated with all solution statements of the primary group solution includes determine that a first correlation value between the next most common solution statement and the solution statements of the primary group solution is greater than or equal to a preselected positive correlation threshold value.

21. The server of claim 13, wherein the processing circuit is further adapted to:
receive a first solution statement of the plurality of solution statements from a first user of the plurality of users;
analyze semantics of the first solution statement and determine that the first solution statement is similar in meaning to a second solution statement of the plurality of solution statements, the second solution statement having been received by a greater number of users than the first solution statement; and
prompt the first user to replace the first solution statement with the second solution statement.

22. A method of generating group solutions to a project, the method comprising:
(a) receiving a plurality of solution statements from a plurality of users;
(b) identifying a most common solution statement from the plurality of solution statements, the most common solution statement received from a subset of users of the plurality of users;
(c) inserting the most common solution statement identified in (b) into a primary group solution;
(d) identifying a next most common solution statement from the plurality of solution statements that has not yet been inserted into the primary group solution;
(e) determining that the next most common solution statement is statistically positively and significantly correlated with all solution statements of the primary group solution, and wherein the next most common solution statement has a substantively different meaning than all other solution statements of the primary group solution;
(f) inserting the next most common solution statement into the primary group solution; and
(g) generating the primary group solution by repeating (d), (e), and (f) until no next most common solution statement is identified;
(h) identifying one or more solution statements of the plurality of solution statements that are statistically negatively and significantly correlated to the most common solution statement;
(i) identifying and inserting a most common negatively correlated solution statement from the one or more solution statements identified in (h) into an alternative group solution;

(j) identifying a next most common negatively correlated solution statement from the solution statements identified in (h) that has not yet been inserted into the alternative group solution;

(k) determining that the next most common negatively correlated solution statement is statistically positively and significantly correlated with all solution statements of the alternative group solution;

(l) inserting the next most common negatively correlated solution statement into the alternative group solution; and (m) generating the alternative group solution by repeating (j), (k), and (l) until no next most common negatively correlated solution statement is identified.

23. The method of claim 22, wherein the solution statements of the primary group solution are ranked and arranged in at least one of a numerical order and/or a hierarchical order consistent with the numerical order and/or hierarchical order most commonly found in the received plurality of solution statements.

24. The method of claim 22, further comprising:
transmitting one or more queries to the plurality of users;
receiving responses to the one or more queries from the plurality of users;
assigning at least two or more users of the plurality of users to each of a first sub-group of users and a second sub-group of users based on the responses received;
generate a first sub-group solution based on the solution statements received from the first sub-group of users; and
generate a second sub-group solution based on the solution statements received from the second sub-group of users.

25. The method of claim 22, further comprising:
receiving a first solution statement of the plurality of solution statements from a first user of the plurality of users;
analyzing semantics of the first solution statement and determine that the first solution statement is similar in meaning to a second solution statement of the plurality of solution statements, the second solution statement having been received by a greater number of users than the first solution statement; and
prompting the first user to replace the first solution statement with the second solution statement.

* * * * *